United States Patent
Murade

(10) Patent No.: US 8,525,960 B2
(45) Date of Patent: Sep. 3, 2013

(54) ELECTRO-OPTICAL DEVICE

(75) Inventor: Masao Murade, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 932 days.

(21) Appl. No.: 11/257,067

(22) Filed: Oct. 25, 2005

(65) Prior Publication Data

US 2006/0038932 A1    Feb. 23, 2006

Related U.S. Application Data

(62) Division of application No. 09/809,207, filed on Mar. 16, 2001, now Pat. No. 7,012,656.

(30) Foreign Application Priority Data

Mar. 17, 2000  (JP) .................................. 2000-077172
Jan. 12, 2001  (JP) .................................. 2001-005540

(51) Int. Cl.
*G02F 1/1343* (2006.01)
*G02F 1/136* (2006.01)
*G02F 1/1333* (2006.01)

(52) U.S. Cl.
USPC ................ 349/110; 349/38; 349/43; 349/111

(58) Field of Classification Search
USPC .................................. 349/5–10, 38, 110–111
See application file for complete search history.

(56) References Cited

U.S. PATENT DOCUMENTS

| | | | |
|---|---|---|---|
| 5,459,596 A | | 10/1995 | Ueda et al. |
| 5,600,461 A | * | 2/1997 | Ueda et al. ........................ 349/38 |
| 5,708,485 A | * | 1/1998 | Sato et al. ........................ 349/42 |
| 5,724,107 A | * | 3/1998 | Nishikawa et al. ............... 349/38 |
| 5,777,701 A | * | 7/1998 | Zhang ............................... 349/44 |
| 5,812,231 A | | 9/1998 | Kochi et al. |
| 5,818,552 A | | 10/1998 | Sato |
| 5,956,103 A | * | 9/1999 | Ishiguro ........................... 349/38 |
| 5,986,723 A | * | 11/1999 | Nakamura et al. ............... 349/39 |
| 6,067,131 A | * | 5/2000 | Sato .................................. 349/43 |
| 6,141,066 A | | 10/2000 | Matsushima |
| 6,181,389 B1 | * | 1/2001 | Takei et al. ....................... 349/44 |
| 6,330,044 B1 | | 12/2001 | Murade |
| 6,335,772 B1 | * | 1/2002 | Sato et al. ........................ 349/44 |
| 6,567,136 B1 | * | 5/2003 | Sakuramoto et al. ............ 349/43 |
| 6,567,147 B1 | * | 5/2003 | Hirakata ......................... 349/153 |
| 2002/0149016 A1 | | 10/2002 | Yamazaki et al. |

FOREIGN PATENT DOCUMENTS

| | | |
|---|---|---|
| JP | 05-203994 | 8/1993 |
| JP | 08-262494 | 10/1996 |
| JP | A-09-043639 | 2/1997 |
| JP | 10-293323 | 11/1998 |
| JP | 10-301100 | 11/1998 |

* cited by examiner

*Primary Examiner* — Jessica M Merlin
(74) *Attorney, Agent, or Firm* — Oliff & Berridge, PLC

(57) ABSTRACT

An electro-optical device includes a substrate on which a TFT, a data line, a scanning line, a capacitance line, a first intermediate conductive layer, a second intermediate conductive layer, and a pixel electrode are formed. A first contact hole, via which the drain of the TFT and the first intermediate conductive layer are connected to each other, is formed in an area which overlaps, in plan view, with the data line. The above-described structure of this electro-optical device, which includes the intermediate conductive layer disposed between the pixel electrode and the pixel switching TFT, allows an increase in the pixel aperture ratio and also an increase in the storage capacitance. Besides, degradation in the quality of a displayed image due to steps formed, in the vicinity of the pixel electrode, on the surface of an alignment film is minimized.

20 Claims, 12 Drawing Sheets

ELECTRO-OPTICAL DEVICE

This is a Division of application Ser. No. 09/809,207 filed Mar. 16, 2001. The entire disclosure of the prior application is hereby incorporated by reference herein in its entirety.

BACKGROUND OF THE INVENTION

1. Field of Invention

The present invention relates to an electro-optical device using an active matrix addressing method. More particularly, the present invention relates to an electro-optical device including an intermediate conductive layer which serves to provide a good electrical connection between a pixel electrode and a pixel switching thin film transistor (hereinafter also referred to as a TFT), and which is formed as one of layer of a multilayer structure formed on a substrate.

2. Description of Related Art

In a conventional electro-optical device using TFTs as active matrix addressing elements, when a scanning signal is applied to the gate electrode of a TFT via a scanning line, the TFT is turned on, and an image signal applied via a data line to the source region of the semiconductor layer is supplied to a pixel electrode via that TFT. Because the period during which an image signal is supplied to each pixel electrode via a TFT is very short, a storage capacitor is generally added to each pixel electrode to retain an image signal supplied to each pixel electrode over a period of time much longer than the period of time during which the TFT is in the ON state.

In this type of electro-optical device, various conductive films serving as scanning lines, data lines and the like and a gate insulating film and an interlayer insulating film for electrically isolating the conductive films from each other are formed in a multilayer between a conductive film such as an ITO film serving as a pixel electrode and a semiconductor layer of a TFT serving as a pixel switching element. Thus, the distance between the pixel electrode and the semiconductor layer is as large as about 1000 nm. This makes it difficult to electrically connect the pixel electrode and the semiconductor layer with each other via only a single contact hole. One known technique of solving the above problem is to form an intermediate conductive layer between interlayer insulating films so that the pixel electrode and the semiconductor layer are electrically connected to each other via this intermediate conductive layer.

SUMMARY OF THE INVENTION

In the above-described type of electro-optical device, there is a strong need for improving the quality of a displayed image. To meet such a need, it is very important to reduce the pixel pitch and increase the aperture ratio (that is, increase the aperture area through which light passes relative to the light-shielding area through which light cannot pass, in each pixel).

The use of the intermediate conductive layer described above results in not only an increase in the number of production processing steps, but also increases in the number of layers formed in the multilayer structure and the number of contact holes. As a result, the multilayer structure becomes more complicated. Thus, as the pixel pitch is reduced, it becomes more difficult to form the above-described storage capacitor and to find areas in which to form contact holes. Another problem due to the increase in the number of contact holes as a result of the formation of the intermediate conductive layer is that the contact holes create steps in an interlayer insulating film above the contact holes, and thus create steps in the pixel electrode and in an alignment film formed on the pixel electrode. The steps formed in the alignment film, in the vicinity of the pixel electrode, can make it impossible to correctly orient an electro-optical material such as a liquid crystal, which can cause an operational failure. As a result, a reduction in contrast and thus a great reduction in image quality occur.

An object of the present invention is to provide an electro-optical device which has an increased pixel aperture ratio and has reduced steps at the surface of an alignment film, near pixel electrodes, and which is thus capable of displaying a high-quality image.

(1) One exemplary embodiment of the present invention provides an electro-optical device which may include: a thin film transistor formed on a substrate; a pixel electrode electrically connected to a drain region of a semiconductor layer of the thin film transistor; a plurality of interconnection lines disposed between the semiconductor layer of the thin film transistor and the pixel electrode via an insulating film; an intermediate conductive layer for electrically connecting the drain region of the semiconductor layer of the thin film transistor and the pixel electrode; and a first contact hole formed in an area under at least one of the plurality of interconnection lines, the first contact hole serving to electrically connect to the drain region of the semiconductor layer of the thin film transistor to the intermediate conductive layer.

In the electro-optical device according to this exemplary embodiment of the present invention, because the drain region of the semiconductor layer and the pixel electrode are electrically connected to each other via the intermediate conductive layer, it is possible to achieve a good electrical connection between them via two contact holes with small diameters, even when there is a thick film between them. Because the respective contact holes can be formed in small areas, the pixel aperture ratio can be increased.

Furthermore, because the first contact hole is formed in an area in which at least one interconnection line is formed, the presence of the first contact hole does not cause formation of an irregular step in the aperture area of each pixel. This makes it possible to uniformly perform rubbing in the area in which pixel electrode is formed, and it also becomes possible to obtain good uniformity in the thickness of the electro-optical material. As a result, the operation failure due to the orientation failure of the electro-optical material such as a liquid crystal is reduced.

In the electro-optical device according to the present invention, as described above, an increase in the pixel aperture ratio is achieved, and degradation in the quality of a displayed image due to irregular steps on the surface of the alignment film near the pixel electrode is minimized, and thus it is possible to display a high-quality image with high brightness and high contrast.

(2) In one exemplary aspect of the electro-optical device according to the present invention, the diameter of the first contact hole is smaller than the diameter of a second contact hole serving to electrically connect the intermediate conductive layer to the pixel electrode.

In this aspect, the intermediate conductive layer serves to prevent over etching from occurring during the etching process for forming the second contact hole. Furthermore, because the diameter of the second contact hole is smaller than that of the first contact hole, it is possible to reduce the non-aperture pixel area.

(3) In another exemplary aspect of the electro-optical device according to the present invention, at least one of the plurality of interconnection lines serves as a data line electrically connected to a source region of the semiconductor layer of the thin film transistor, and the first contact hole is located in an area under the data line.

In this aspect, because the first contact hole is disposed in the non-aperture pixel area, it is possible to reduce the steps on the surface of the alignment film.

(4) In still another exemplary aspect, the first contact hole is preferably disposed near a location where the data line and the scanning line cross each other.

In this aspect, because the first contact hole is disposed near the location where the data line and the scanning line cross each other, the steps on the surface of the alignment film can be reduced over a large area. This makes it possible to uniformly perform rubbing in the area in which pixel electrode is formed, and thus it becomes possible to reduce the orientation failure of the liquid crystal layer.

(5) In still another exemplary aspect, at least one of the plurality of interconnection lines serves as a scanning line extending in a direction crossing the data line, and the intermediate conductive layer extends along the scanning line from an area of the data line.

In this aspect, because the intermediate conductive layer extends along the scanning line from the data line area, the first contact hole and the second contact hole can be formed in areas along the data line and the scanning line, and thus it becomes possible to reduce the pixel pitch.

(6) In still another exemplary aspect, a second contact hole, via which the intermediate conductive layer and the pixel electrode are electrically connected to each other, is preferably formed in an area where the intermediate conductive layer extends along the scanning line.

In this aspect, the second contact hole is formed in the area where the intermediate conductive layer extends along the scanning line, and the second contact hole has a smaller diameter than that of a conventional contact hole via which the drain region and the pixel electrode are connected to each other. This makes it possible to reduce the steps formed on the surface of the alignment film while reducing the non-aperture pixel area near the scanning line.

(7) In still another exemplary aspect, the second contact hole is preferably formed at a substantially middle location between adjacent data lines.

In this aspect, the influence of the steps of the alignment film above the second contact hole becomes symmetric about the location of the second contact hole for each pixel, and thus nonuniformity of the respective pixels in terms of the displaying characteristic is averaged when all pixels are seen in a macroscopic fashion.

(8) In still another exemplary aspect, the intermediate conductive layer extends along the data line.

In this aspect, the area where the first contact hole is formed under the data line can be covered with the intermediate conductive layer without expanding the non-aperture pixel area.

(9) In still another exemplary aspect of the electro-optical device according to the present invention, at least one of the plurality of interconnection lines serves as a capacitance line which extends under the intermediate conductive layer while avoiding the area where the first contact hole is formed.

In this aspect, because the capacitance line is extended while avoiding the first contact hole with the smaller diameter than the diameter of the convention contact hole via which the drain region and the pixel electrode are connected to each other, the area needed to form the capacitor can be obtained without creating steps on the surface of the alignment film.

(10) In still another exemplary aspect of the electro-optical device according to the present invention, the depth of the first contact hole is smaller than that of the second contact hole formed between the intermediate conductive layer and the pixel electrode.

In this aspect, steps on the surface of the alignment film in the area where the first contact hole is formed are reduced.

(11) In still another exemplary aspect of the electro-optical device according to the present invention, the intermediate conductive layer faces, via an interlayer insulating film and at least partially, a capacitor electrode formed of the same film as the film forming the scanning line.

In this aspect, because the intermediate conductive layer faces, via an interlayer insulating film, the capacitor electrode formed of the same film as the film forming the scanning line, it is possible to form an additional storage capacitor connected to the pixel electrode. That is, the storage capacitor can be formed not only below the capacitor electrode but also above the capacitor electrode, and thus it is possible to increase the capacitance of the storage capacitor efficiently using a limited light-shielding area.

(12) In still another exemplary aspect, the second contact hole is formed at a location which overlaps, in plan view, with the capacitor electrode.

In this aspect, the part, at the location where the second contact hole is formed, of the intermediate conductive layer also overlaps, in plan view, with the capacitor electrode, that is, the part faces the capacitor electrode via an insulating film, so that the storage capacitor is also formed in the area where the second contact hole is formed.

(13) In still another exemplary aspect, the capacitor electrode includes a part extending along the scanning line and a part extending along the data line from a location where the capacitor electrode and the data line cross each other, in plan view, and the intermediate conductive layer overlaps, at least partially, with the capacitance electrode via an interlayer insulating film.

In this aspect, in the light-shielding area along the data line, the electrode formed by extending the drain region of the semiconductor layer and the capacitance electrode are disposed such that they face each other, and the capacitance electrode and the intermediate conductive layer are disposed such that they face each other. Thus, the storage capacitor having a vertically stacked form can be built also in the light-shielding area along the data line.

(14) In still another exemplary aspect of the electro-optical device according to the present invention, the intermediate conductive layer includes a conductive film having an ability to block light.

In this aspect, the intermediate conductive layer including the light-shielding conductive film serves to prevent the channel region of the thin film transistor and its adjacent area from being illuminated with light. In general, if the channel region of the semiconductor layer of the thin film transistor or its adjacent area is illuminated with light, a leakage current is generated by excitation of light. The leakage current can cause a change in the characteristic of the thin film transistor in the off-state. In the present invention, the intermediate conductive layer prevents the characteristic of the transistor from changing due to illumination of light.

(15) In still another exemplary aspect, the intermediate conductive layer defines a part of the light-shielding area.

In this aspect, it becomes unnecessary, at least partially, to form a light-shielding film, to define the light-shielding area, on the opposite substrate disposed at a location opposing the substrate on which the pixel electrode and other elements are formed, or to form the data line so as to have an expanded width to define the light-shielding area, or to form an additional dedicated light-shielding film for defining the light-shielding area. Thus, because the light-shielding film for defining the light-shielding area becomes, at least partially, unnecessary, even if an alignment error occurs when the two substrates are adhesively bonded to each other, the alignment error does not result in a reduction in the transmittance of the electro-optical device. As a result, a great reduction in defects of the electro-optical devices can be realized.

(16) In still another exemplary aspect, the intermediate conductive layer includes a part extending along the data line, and this part defines a part of the light-shielding area along the data line.

In this aspect, in the area in which the light-shielding area is defined by the intermediate conductive layer, it becomes, at least partially, unnecessary to form a light-shielding film, on the opposite substrate, to define the light-shielding area, or to form the data line so as to have an expanded width to define the light-shielding area, or to form an additional dedicated light-shielding film for defining the light-shielding area. This makes it possible to greatly reduce the variation in the transmittance of the electro-optical device.

(17) In still another exemplary aspect, the capacitor electrode includes a part extending along the data line, in plan view, and, in an area along the data line, the width Wd of the data line, the width Wc of the capacitor electrode, and the width Wm of the part, extending along the data line, of the intermediate conductive layer are selected so as to satisfy a condition Wd<Wc<Wm.

In this aspect, light incident on the opposite substrate of the pair of substrates is doubly blocked by the data line and the intermediate conductive layer. The data line used to supply an image signal needs to have low resistance. Therefore, the data line is generally formed of an aluminum film to achieve low resistance. However, although the aluminum film has the ability to block light, it also has very high reflectance. Therefore, in the case where light is blocked only by the data line formed of an aluminum film, projection light or reflected light incident at an oblique angle on the substrate surface is reflected by the inner surface of the data line (that is, by the surface which faces the thin film transistor), and light can finally reach the channel region or its adjacent regions after multiple reflection in the multilayer structure. In contrast, in the structure according to the present invention, because the intermediate conductive layer located under the data line is formed of a refractive metal film or a polysilicon film having low reflectance, multiple reflection of light is reduced. Besides, it is possible to form a storage capacitor with further greater capacitance using the capacitor electrode and the intermediate conductive layer both having greater widths than the data line.

(18) In still another exemplary aspect, an edge portion, extending along the data line, of the pixel electrode overlaps with an edge portion of the intermediate conductive layer.

In this aspect, it is possible to further reduce the data line width. This makes it possible to minimize the parasitic capacitance between the data line and the pixel electrode, and, therefore, it is possible to prevent the reduction in contrast, and it is also possible to greatly suppress ghost and crosstalk which cause degradation in the image quality.

(19) In still another exemplary aspect of the electro-optical device according to the present invention, the semiconductor layer is formed in an area under the data line.

In this aspect, it becomes possible to secure an area in which the semiconductor layer and the pixel electrode are electrically connected to each other, and it also becomes possible to reduce the non-aperture regions along the scanning line.

(20) In still another exemplary aspect, the first contact hole is formed at a location symmetrical to the location of a third contact hole via which the source region of the semiconductor layer and the data line are connected to each other, about the channel region of the semiconductor layer.

In this aspect, steps arising from the multilayer interconnection lines are formed at locations symmetric about the data line, and thus it is possible to eliminate the difference in loss of light depending upon the rotation direction of the liquid crystal.

(21) In still another exemplary aspect, there is further provided a lower light-shielding film which is disposed under the semiconductor layer and which projects, in plan view, from the scanning line, and the second contact hole via which the intermediate conductive layer and the pixel electrode are electrically connected to each other is located in an area into which the lower light-shielding film projects, in plan view, from the scanning line.

In this aspect, because the semiconductor layer is not formed along the data line, it is possible to reduce the non-aperture areas along the scanning line, and it is also possible to electrically connect the intermediate conductive layer and the pixel electrode with each other.

(22) Another exemplary embodiment of the present invention provides an electro-optical device which may include: a thin film transistor formed on a substrate; a data line electrically connected to a drain region of a semiconductor layer of the thin film transistor; a pixel electrode electrically connected to a drain region of a semiconductor layer of the thin film transistor; an intermediate conductive layer having an ability to block light for electrically connecting the drain region of the semiconductor layer of the thin film transistor and the pixel electrode; a capacitance line which is disposed in the drain region of the semiconductor layer of the thin film transistor and which extends along the data line; a light-shielding film formed of the same film as that of the intermediate conductive layer; and a contact hole via which the capacitance line and the light-shielding film are electrically connected with each other in an area under the data line.

In this exemplary embodiment, the contact hole via which the light-shielding film and the capacitance line are connected to each other is covered with the data line, and thus steps formed on the surface of the alignment film near the contact hoe can be reduced. Furthermore, it is also possible to increase the capacitance by using the light-shielding film as the capacitor electrode.

DETAILED DESCRIPTION OF PREFERRED EMBODIMENTS

Exemplary embodiments of the present invention are described below with reference to drawings.

First Exemplary Embodiment

Figure 1:
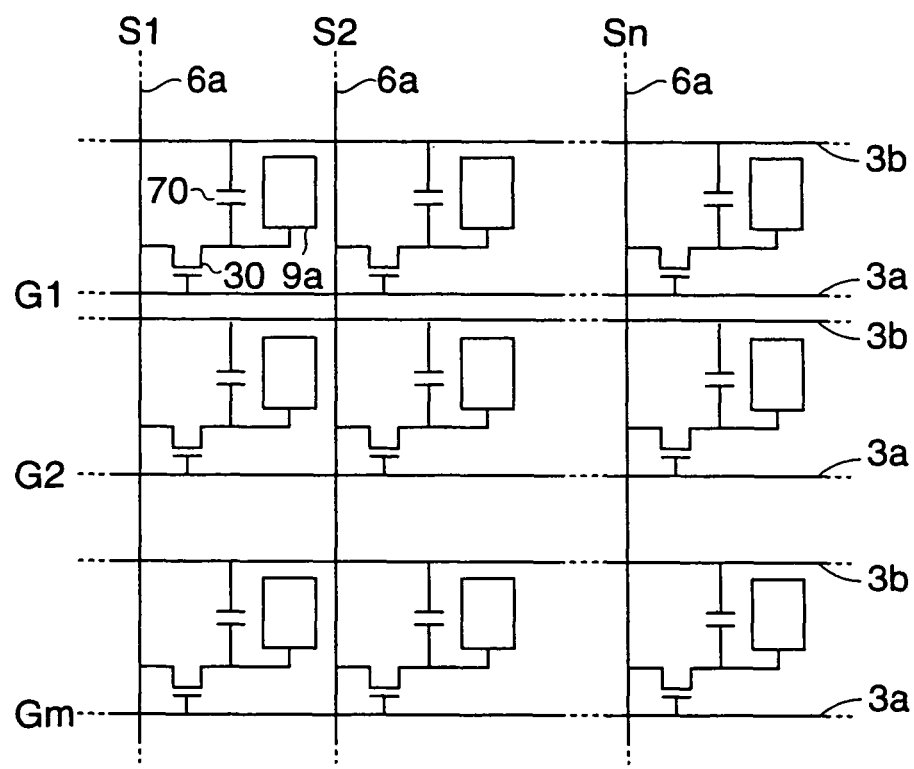
FIG. 1 is an equivalent circuit diagram of various elements and interconnection lines disposed in a plurality of pixels arranged in a matrix fashion in an image display area of an electro-optical device according to a first exemplary embodiment of the present invention.
Figure 2:
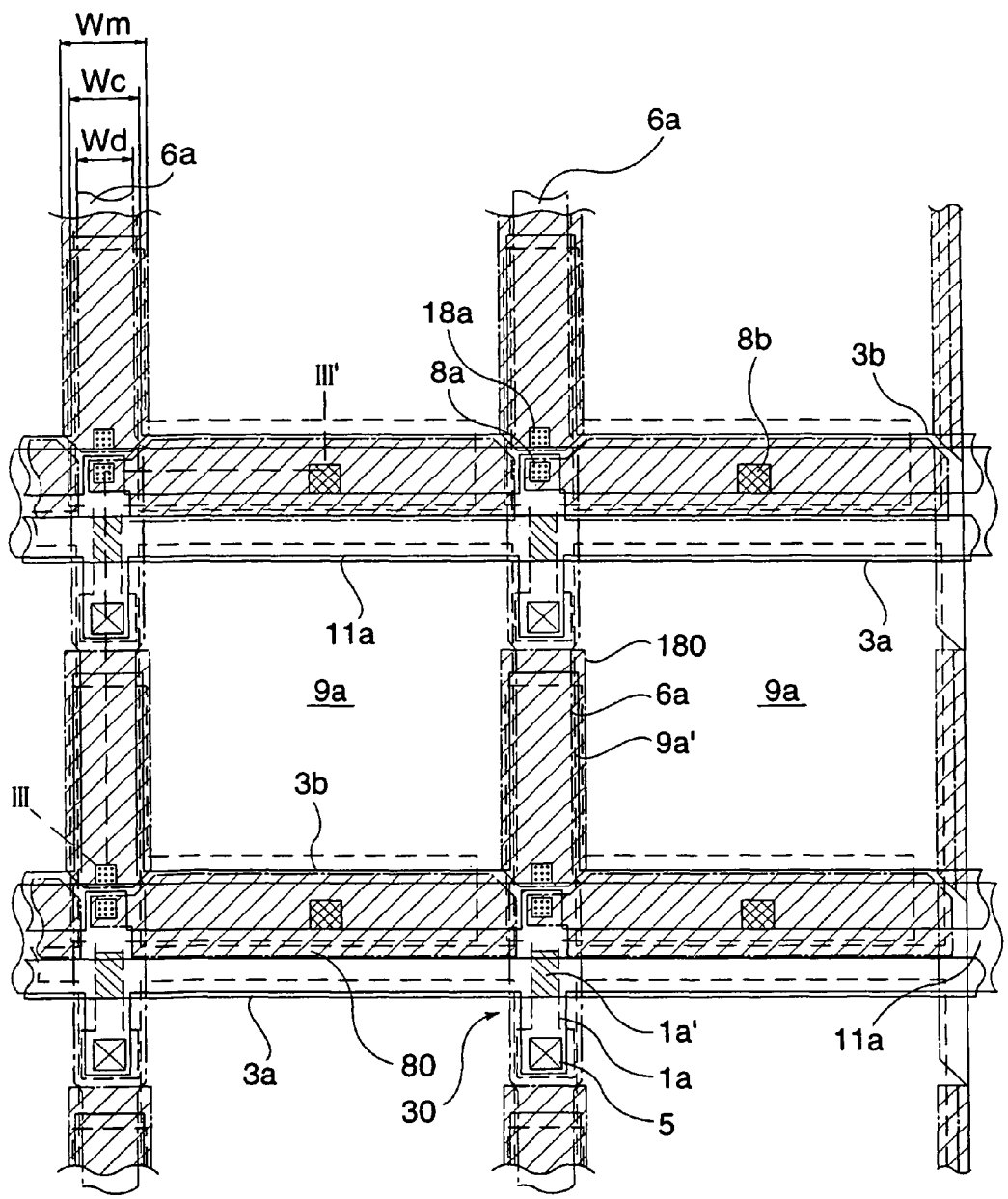
FIG. 2 is a plan view illustrating some pixels formed at adjacent locations on a TFT array substrate of the liquid crystal device according to the first embodiment, wherein data lines, scanning lines, and pixel electrodes are formed on the TFT array substrate.
Figure 3:
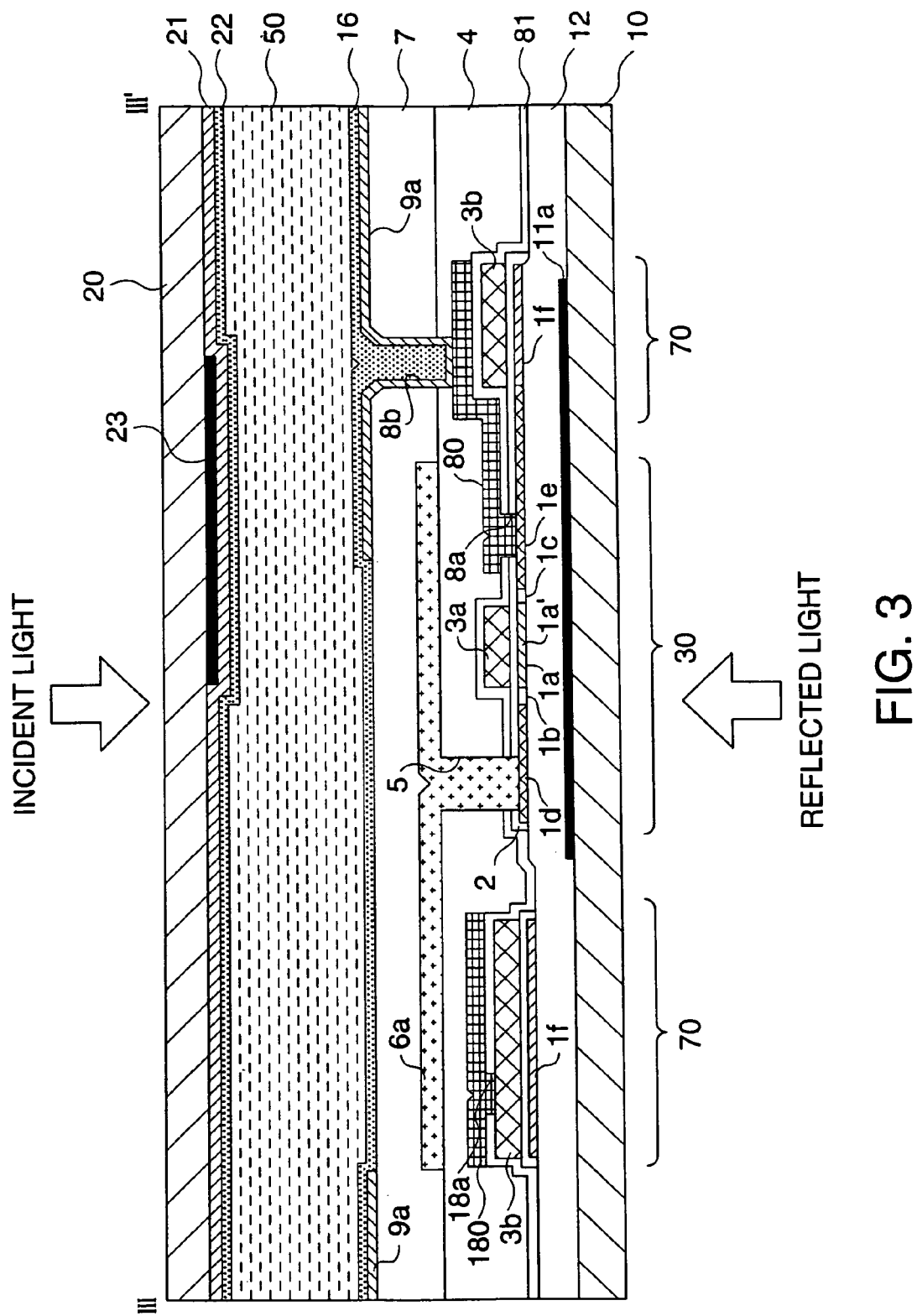
FIG. 3 is a cross-sectional view taken along line III-III' of FIG. 2.
Figure 4:
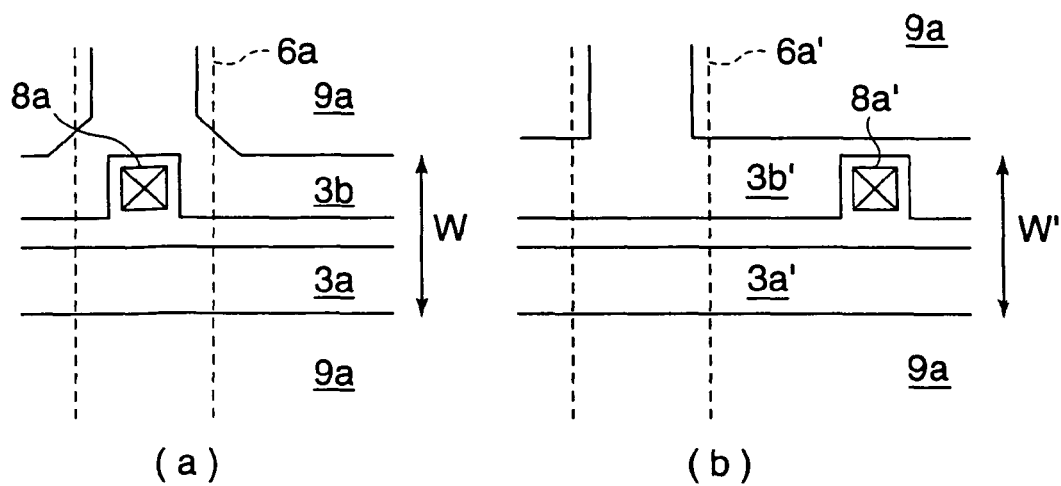
FIGS. 4(A)-(B) are plan views partially illustrating, in an enlarged fashion, a capacitance line pattern and a scanning line pattern, wherein comparative examples of a capacitance line pattern and a scanning line pattern are also shown.
Figure 5:
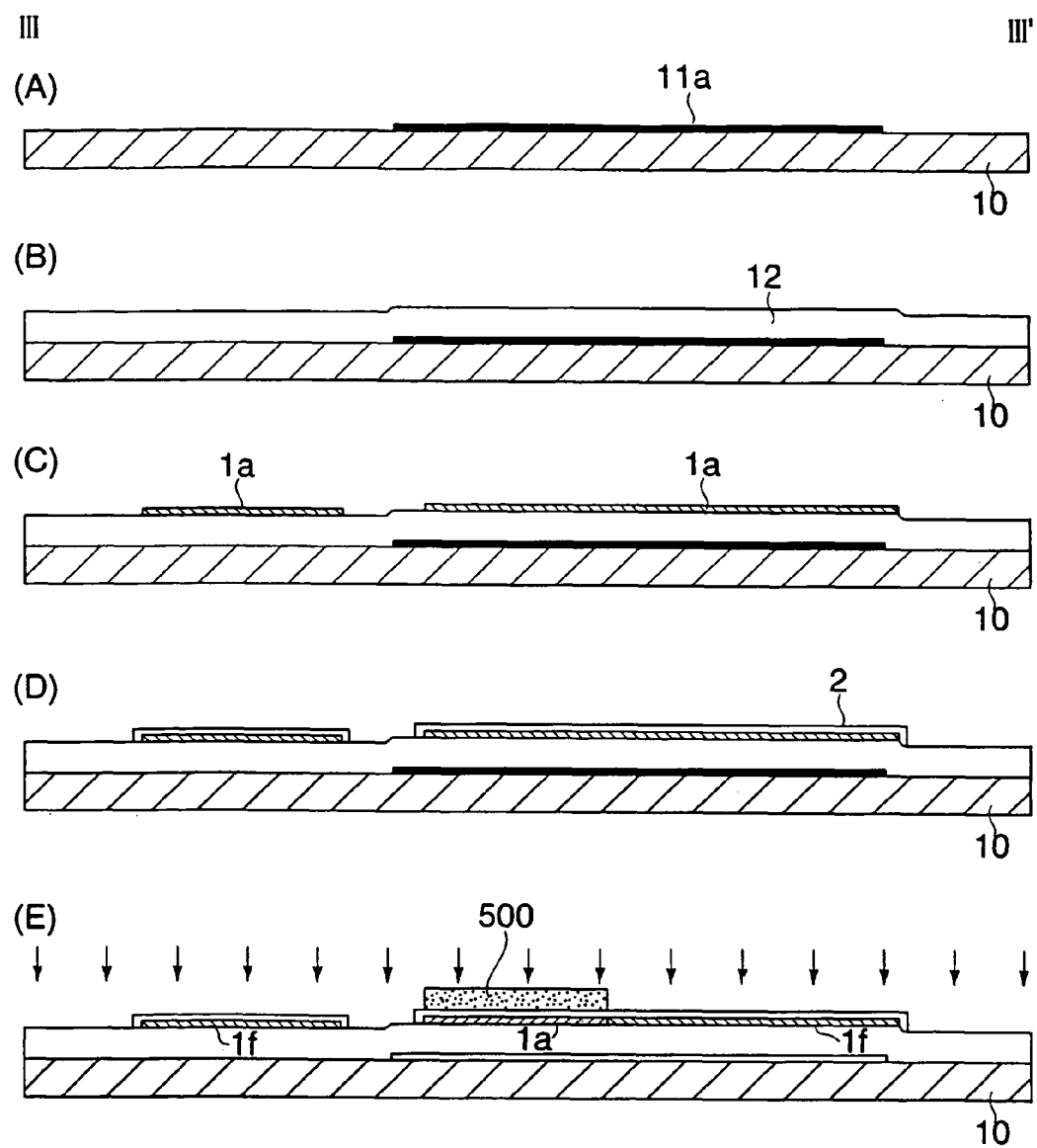
FIGS. 5(A)-(E) illustrate a first part of a flow of a production process of the liquid crystal device according to the first embodiment, wherein respective steps of the production process for an image display area are shown.
Figure 6:
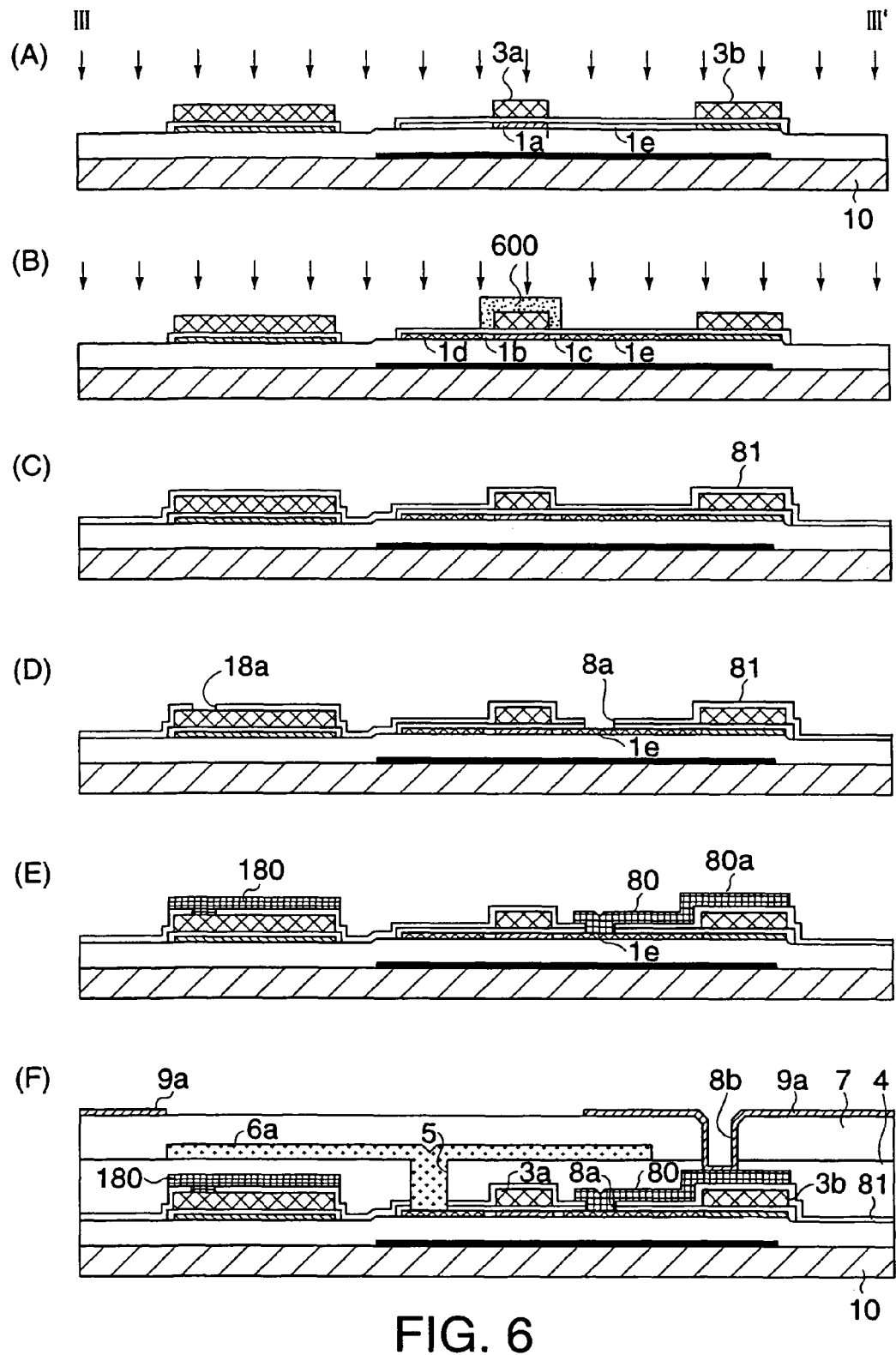
FIGS. 6(A)-(F) illustrate a second part of the flow of the production process of the liquid crystal device according to the first embodiment, wherein respective steps of the production process for the image display area are shown.

The structure of an electro-optical device in the form of a liquid crystal device according to a first exemplary embodiment of the present invention is described below with reference to FIGS. 1 to 4(B). FIG. 1 illustrates an equivalent circuit of various elements and interconnections of respective pixels arranged in a matrix fashion in an image display area of the electro-optical device. FIG. 2 is a plan view illustrating some pixels formed at adjacent locations on a TFT array substrate on which data lines, scanning lines, and pixel electrodes are also formed. FIG. 3 is a cross-sectional view taken along line III-III' of FIG. 2. In FIG. 3, in order to provide an easily understandable view, the respective layers and members are displayed in different magnification ratios. FIG. 4(A)-(B) are plan views illustrating in an enlarged fashion a part of a pattern of a capacitance line and a scanning line according to the present embodiment (FIG. 4(A)) wherein a capacitance line and a scanning line according to a conventional technique are also shown for the purpose of comparison (FIG. 4(B)).

Referring to FIG. 1, in each of the pixels arranged in the matrix fashion in the image display area of the electro-optical device according to the present embodiment, a TFT 30 for controlling a pixel electrode 9a is formed, and a data line 6a supplied with an image signal is electrically connected to the source of the TFT 30. Image signals S1, S2, ..., Sn may be supplied over the data lines 6a in a line-by-line fashion in the order of S1, S2, ..., Sn, or may be supplied in a group-by-group fashion wherein each group consists of a plurality of adjacent data lines 6a. Furthermore, the gate of each TFT 30 is electrically connected to a scanning line 3a so that scanning signals G1, G2, ..., Gm are supplied via the scanning lines 3a in a line-by-line fashion with predetermined timings. The drains of the respective TFT 30s are electrically connected to corresponding pixel electrodes 9a so that when the TFTs 30 serving as switching elements are closed for a predetermined period with predetermined timings, the image signals S1, S2, ..., Sn supplied via the data lines 6a are applied to the pixel electrodes 9a. The image signals S1, S2, ..., Sn with particular signal levels are applied to a liquid crystal via the respective pixel electrodes 9a, and the image signals are retained between the pixel electrodes 9a and corresponding opposite electrodes (which will be described later) formed on an opposite substrate (which will be described later) over a predetermined period of time. The orientation of molecules of the liquid crystal changes depending upon the level of the applied voltage, and thus light is modulated so that a gray scale display is realized. In the case of a normally white mode, the amount of light passing through the liquid crystal decreases with increasing applied voltage. On the other hand, in the case of a normally black mode, the amount of light passing through the liquid crystal increases with increasing applied voltage. In any case, as a whole, light having contrast corresponding to an image signal is output from the electro-optical device. In order to retain the image signal without a loss due to leakage, a storage capacitor 70 is added in parallel with a liquid crystal capacitance formed between each pixel electrode 9a and the opposite electrode, wherein the storage capacitor 70 is formed between a capacitor electrode realized using a part of the capacitor line 3b and a capacitor electrode electrically connected to the pixel electrode 9a, these two capacitor electrodes being disposed so as to face each other via a dielectric film. The voltage applied to each pixel electrode 9a is retained in the corresponding storage capacitor 70 for a period of time which is, for example, three orders of magnitude longer than the period of time during which the source voltage is applied. This results in an improvement in the retaining characteristic, and thus it becomes possible to realize an electro-optical device with high contrast.

Referring to FIG. 2, on the TFT array substrate of the electro-optical device, plurality of transparent pixel electrodes 9a (whose outlines are represented by broken lines 9a') are formed in a matrix fashion, and data lines 6a, scanning lines 3a, and capacitance lines 3b are formed along the horizontal and vertical boundaries of the pixel electrodes 9a. Each pixel electrode 9a is electrically connected to a drain region, which will be described later, in a semiconductor layer 1a, via a first intermediate conductive layer 80 which is an example of the intermediate conductive layer, and also via a first contact hole 8a and a second contact hole 8b. Each data line 6a is electrically connected to a drain region, which will be described later, in the semiconductor layer 1a made of polysilicon or the like via a contact hole 5. A scanning line 3a is disposed such that it faces the channel region 1a' (shaded with diagonal lines extending from upper left to lower right, in FIG. 2) in the semiconductor layer 1a so that the scanning line 3a serves as a gate electrode. As described above, TFT 30s are formed at respective locations where the scanning lines 3a and the data lines 6a cross each other wherein the scanning lines 3a extending in opposition to the channel regions 1a' serve as the gate electrodes of the respective TFTs 30.

The capacitance lines 3b are made of the same film as that forming the scanning lines 3a. Each capacitance line 3b includes a part extending substantially linearly in parallel with the scanning lines 3a and a part extending along a data line 6a from a location where the scanning line 3a crosses the data line 6a to a location near a contact hole 5 associated with an adjacent pixel.

In FIG. 2, areas surrounded by thick solid lines 11a denote a first light-shielding film. The first light-shielding film includes parts disposed at least in areas under the semiconductor layers 1a of respective TFTs 30. More specifically, in FIG. 2, the first light-shielding film 11a is formed in strips extending along the respective scanning lines 3a, and the width of the strips is expanded downward in FIG. 2 at locations where the first light-shielding film 11a and the data lines 6a cross each other such that the channel regions 1a' of the respective TFTs and their adjacent areas are covered with the expanded parts when seen from the side of the TFT array substrate. The first light-shielding film 11a may be formed by extending the lower part of the scanning line 3a into a strip along the scanning line 3a as in the present embodiment, or may be formed by extending the lower part of the data line 6a into a strip along the data line 6a. Alternatively, the first light-shielding film 11a may be formed by extending the lower parts of the scanning line 3a and the data line 6a into a lattice along the scanning line 3a and the data line 6a. Preferably, the first light-shielding film 11a includes a part formed in an area outside the image display area in which the plurality of pixel electrodes 9a are formed in the matrix fashion wherein that part is electrically connected to a most suitable constant voltage selected from the group consisting of negative and positive constant voltages supplied to peripheral circuits, such as a scanning line driver circuit and a data line driver circuit for driving the electro-optical device, a ground voltage, and a constant voltage supplied to the opposite electrode, so as to maintain the first light-shielding film 11a at a fixed voltage, thereby preventing the TFTs 30 from operating erroneously.

In the present embodiment, first contact holes 8a, via which the drain regions 1e and the first intermediate conductive layer 80 are electrically connected to each other, are formed under the data lines 6a, and second contact holes 8b, via which the first intermediate conductive layer 80 and the pixel electrodes 9a are electrically connected to each other, are formed above capacitance lines 3b at substantially middle locations between adjacent data lines 6a. Furthermore, a second intermediate conductive layer 180 is formed in islands along the data lines 6a, using the same film as that of the first intermediate conductive layer 80. More specifically, the second intermediate layer 180 is formed so as to overlap with each part, which extends along a data line 6a, of the capacitance line 3b. The second intermediate conductive layer 180 may be electrically connected to the capacitance lines 3b via contact holes 18a formed under the data lines 6a. The electrical connection of the second intermediate conductive layer 180 to the capacitance lines 3b allows the second intermediate conductive layer 180 to be maintained at a fixed voltage, thereby preventing an influence upon the image signal supplied via the data lines 6a. The capacitance line 3b is formed so as to have a partially narrowed part formed in a light-shielding area where the first contact hole 8a is formed and where the capacitance line 3b crosses the data line 6a, so that the capacitance line 3b extends while avoiding the first contact hole 8a and such that the capacitance line 3b does not have an electrical contact with the first contact holes 8a.

As can be seen from FIG. 2 and the cross-sectional view shown in FIG. 3, the channel regions 1a' are disposed at locations where the scanning lines 3a and the data lines 6a cross each other, heavily-doped source regions 1d, lightly-doped source regions 1b, channel regions 1a', lightly-doped drain regions 1c, and heavily-doped drain regions 1e in the semiconductor layer 1a are formed such that they overlap with corresponding data lines 6a and such that they are covered with the corresponding data lines 6a. Furthermore, the heavily-doped source regions 1d, lightly-doped source regions 1b, channel regions 1a', lightly-doped drain regions 1c, and heavily-doped drain regions 1e in the semiconductor layer 1a are disposed such that the heavily-doped source regions 1d and the lightly-doped source regions 1b are located under the corresponding data lines 6a extending in one direction from the corresponding scanning lines 3a, and the lightly-doped drain regions 1c and the heavily-doped drain regions 1e are located under the corresponding data lines 6a extending in the opposite direction from the corresponding scanning lines 3a. Each heavily-doped drain region 1e is electrically connected to the first intermediate conductive layer 80 via the corresponding first contact hole 8a, and the first intermediate conductive layer 80 is connected to the corresponding pixel electrode 9a via the corresponding second contact hole 8b. Each heavily-doped source region 1d is electrically connected to the corresponding data line 6a via the corresponding third contact hole 5. Because the first contact holes 8a and the third contact holes 5 are formed in areas overlapping with the data lines 6a in non-display areas, it is possible to prevent the aperture ratio from being reduced by the contact holes. Furthermore, it is possible to prevent irregular steps from being formed in the aperture areas of the respective pixels by the presence of the contact holes. Furthermore, because the semiconductor layer is formed so as to overlap with the data lines 6a, the data lines 6a act as light-shielding films which block light which would otherwise strike the semiconductor layer 1a.

As shown in the cross-sectional view shown in FIG. 3, the electro-optical device includes a transparent TFT array substrate 10 employed as an example of a substrate, and also includes a transparent opposite substrate 20 disposed in opposition to the TFT array substrate 10. The TFT array substrate 10 may be formed of, for example, quartz, glass, or silicon and the opposite substrate 20 may be formed of, for example, glass or quartz. The TFT array substrate 10 includes the pixel electrodes 9a formed thereon. An alignment film 16, which has been subjected to an aligning process such as a rubbing process, is disposed on the pixel electrodes 9a. The pixel electrodes 9a may be made of a transparent conductive film such as an ITO (Indium Tin Oxide) film. The alignment film 16 may be formed of an organic film such as a polyimide film.

On the other hand, an opposite electrode 21 is formed on the entire area of a surface of the opposite substrate 20, and an alignment film 22 which has been subjected to an aligning process such as a rubbing process is disposed on the opposite electrode 21. The opposite electrode 21 may be made of a transparent conductive film such as an ITO film. The alignment film 22 may be formed of an organic film such as a polyimide film.

Furthermore, on the TFT array substrate 10, TFTs 30 serving as pixel switching elements for switching connections to the pixel electrodes 9a are disposed at locations adjacent to the respective pixel electrodes 9a.

Furthermore, on the opposite substrate 20, as shown in FIG. 3, a second light-shielding film 23 is formed in the light-shielding area of each pixel. As will be described in detail later, the second light-shielding film 23 blocks light incident on the opposite substrate 20, thereby preventing the channel regions 1a' of the semiconductor layer 1a of the respective TFTs 30 serving as the pixel switching elements and also areas, including the lightly-doped source regions 1b and the lightly-doped, drain regions 1c, adjacent to the channel regions 1a' from being illuminated with the light. Furthermore, the second light-shielding film 23 also serves to improve the contrast and prevent different colorants from being mixed when a color filter is formed.

Between the TFT array substrate 10 and the opposite substrate 20 which are constructed in the above-described manner and disposed such that the pixel electrodes 9a and the opposite electrode 21 face with each other, a liquid crystal which is an example of an electro-optical material is sealed in a space enclosed by a sealing material, which will be described later, so as to form a liquid crystal layer 50. When no electric field is applied to the liquid crystal layer 50 by the pixel electrodes 9a, the liquid crystal layer 50 is oriented in a particular direction by the alignment films 16 and 22. The liquid crystal layer 50 may consist of, for example, one type of nematic liquid crystal or a mixture of two or more types of nematic liquid crystals. The sealing material is an adhesive such as a photosetting or thermosetting resin for adhesively bonding the TFT array substrate 10 and the opposite substrate 20 with each other along their perimeters. The sealing material contains spacer elements such as glass fibers or glass beads, for spacing the two substrates a predetermined distance apart from each other.

Furthermore, as shown in FIG. 3, the first light-shielding film 11a is formed between the TFT array substrate 10 and each TFT 30 serving as the pixel switching element such that the first light-shielding film 11a is disposed at a location opposing each TFT 30 serving as the pixel switching element. Preferably, the first light-shielding film 11a is made of an opaque refractory metal such as Ti (titanium), Cr (chromium), W (tungsten), Ta (tantalum), Mo (molybdenum), or Pb (lead), or an alloy or metal silicide containing at least one of the refractory metals described above. The use of such a material for the first light-shielding film 11a makes it possible to prevent the first light-shielding film 11a from being damaged or melting during a process in which the pixel switching TFTs 30 are formed. The presence of the first light-shielding film 11a prevents light such as that reflected by the TFT array substrate 10 from striking the channel region 1a', the lightly-doped source region 1b, and the lightly-doped drain region 1c of each pixel switching TFT 30 sensitive to light, thereby preventing the characteristic of each pixel switching TFT 30 from changing due to a leakage current caused by illumination of light.

An underlying insulating film 12 is disposed between the first light-shielding film 11a and the respective pixel switching TFTs 30 so that the semiconductor layer 1a forming each pixel switching TFT 30 is electrically isolated from the first light-shielding film 11a by the underlying insulating film 12. The underlying insulating film 12 is formed on the entire area of the TFT array substrate 10 so that the underlying insulating film 12 also serves as an underlying film on which each pixel switching TFT 30 is formed. That is, the formation of the underlying insulating film 12 prevents the characteristic of the pixel switching TFTs 30 from being degraded by damage which is created when the surface of the TFT array substrate 10 is polished or by contamination which still remains after a cleaning process. The underlying insulating film 12 may be formed of, for example, high isolation glass such as NSG (non-doped silicate glass, PSG (phosphosilicate glass), BSG (boronsilicate glass), or BPSG (boronphosphosilicate glass), silicon oxide, or silicon nitride. The underlying insulating film 12 also serves as to prevent the pixel switching TFTs 30 from being contaminated by the first light-shielding film 11a.

As shown in FIGS. 2 and 3, each capacitance line 3b made of the same conductive polysilicon film as that used to form the scanning lines 3a has a part serving as a second capacitor electrode which is disposed so as to face, via an insulating thin film 2, a first capacitor electrode 1f which is disposed under the capacitance line 3b and which extends from the drain region 1e of the semiconductor layer 1a, thereby forming a storage capacitor 70 having large capacitance using the insulating thin film 2 which is also used as the gate insulating film of the TFTs 30. A part of each capacitance line 3b faces, via a first interlayer insulating film 81, a part of the first intermediate conductive layer 80 disposed above the capacitance line 3b. If this first interlayer insulating film 81 is formed so as to have a small thickness, it is possible to further increase the capacitance of the storage capacitor 70. That is, the capacitance of the storage capacitor 70 is increased by forming the storage capacitor 70 not only under the capacitance line 3b but also above the capacitance line 3b efficiently using the limited light-shielding area.

In the present embodiment, each capacitance line 3b is formed by extending the second capacitor electrode made of the same film as that used to form the scanning line 3a. Therefore, it is not necessary to form an additional interconnection line dedicated for the capacitance line 3b, and thus no further special processing step is necessary. In the case where the capacitance line 3b cannot be formed using the same film as that used to form the scanning line 3a, the second capacitor electrode may be formed in an island in each pixel, and, for example, the first light-shielding film 11a for supplying a constant potential may be employed as the storage capacitor line. In this case, it is desirable that the first light-shielding film 11a and the second capacitor electrode be electrically connected to each other in each pixel. Because the second capacitor electrode is connected to the most suitable constant potential selected from the group consisting of negative and positive constant potential sources supplied to peripheral circuits (such as a scanning line driving circuit and a data line driving circuit) for driving the electro-optical device, a ground power source, and a constant potential source supplied to the opposite electrode, the storage capacitor 70 formed between the first capacitor electrode 1f and the intermediate conductive layer 80 has high stability.

In the present embodiment, as shown in FIGS. 2 and 3, the first contact holes 8a are formed at locations in areas which overlap, in plan view, with the corresponding data lines 6a. Therefore, when there is a first contact hole 8a via which the semiconductor layer 1a and the first intermediate conductive layer 80, which are respectively located on the lower and upper sides of the electrically conductive polysilicon film forming the scanning line 3a and the capacitance line 3b, are connected to each other, it is possible to easily form the scanning line 3a and the capacitance line 3b in the light-shielding area extending along the data line 6a, while avoiding the first contact hole 8a. This is illustrated in an enlarged fashion in FIG. 4(A).

If, as in a comparative example shown in FIG. 4(B), the first contact hole 8a' is formed in an area in which a part of the scanning line 3a' having no overlap with the data line 6a' and the capacitance line 3b' extend in parallel, it is necessary that the capacitance line 3b' or the scanning line 3a' should be narrowed near the first contact hole 8a' so as to avoid the first contact hole 8a'. However, the narrowing of the capacitance line 3b' or the scanning line 3a' results in an increase in interconnection resistance in the locally narrowed part. This can cause a signal delay or crosstalk which results in degradation in the image quality. In this structure, the width W', measured in the direction along the scanning line 3a', of the light-shielding area becomes greater than the width W, measured in the direction along the scanning line 3a, of the light-shielding area formed according to the present embodiment shown in FIG. 4(A) (that is, W'>W). That is, in the present embodiment, compared with the comparative example, it is possible to increase the pixel aperture region by an amount corresponding to the reduction in the width W, measured in the direction along the scanning line 3a, of the light-shielding area.

Furthermore, by forming the first contact hole 8a in the area in which the light-shielding area extending along the data line 6a and the light-shielding area extending along the scanning line 3a cross each other, as shown in FIG. 4(A), it becomes possible to reduce the irregular steps formed (on the surface of the alignment film 16) above the first contact hole 8a and the capacitance line 3b due to the presence of the first contact hole 8a and the presence of the capacitance line 3b extending in such a manner as to avoid the first contact hole 8a. The first contact hole 8a is located apart from the pixel aperture area. This allows an effective reduction in the influence of the irregular steps arising from the formation of the first contact hole 8a. Furthermore, the reduction in the steps on the surface of the alignment film 16 near the pixel electrode 9a makes it possible to uniformly perform rubbing in the area in which pixel electrode 9a is formed, and it also becomes possible to obtain good uniformity in the thickness of the liquid crystal layer 50. As a result, the orientation failure of the liquid crystal layer 50 is reduced.

Furthermore, because it is not necessary to partially narrow the part, extending along the scanning line 3a, of the capacitance line 3b, it is possible to increase the area of the second capacitor electrode disposed at the location opposing the first capacitor electrode 1f. As a result, an increase in the capacitance of the storage capacitor 70 formed by the second capacitor electrode and the first capacitor electrode 1f can be achieved.

Furthermore, in the present embodiment, as shown in FIG. 2, the second contact hole 8b is formed at a substantially middle locations, in plan view, between two adjacent data lines 6a in the light-shielding area in each pixel. Therefore, the step formed on the alignment film 16 above the second contact hole 8b becomes located at a substantially middle point in the light-shielding area along one edge of each pixel aperture area. As a result, the influence of the step of the alignment film 16 above the second contact hole 8b becomes symmetric in each pixel, and thus nonuniformity of the respective pixels in terms of the displaying characteristic is averaged when all pixels are seen in a macroscopic fashion.

In the present embodiment, as described above, the location of the second contact hole 8b can be selected freely as long as the location is on the first intermediate conductive layer 80 and it does not overlap with the data line 6a.

Thus, in the present embodiment, if the second contact hole 8b is formed at a location which overlaps with the capacitance line 3b, it becomes possible to advantageously form the storage capacitor 70 also in the area where the second contact hole 8b is formed.

In this embodiment, the insulating thin film 2 serving as the dielectric film of the storage capacitor 70 is realized using the gate insulating film itself of the TFT 30 formed on the polysilicon film by means of high temperature oxidation, and thus it is possible to obtain a thin insulating film with a high breakdown voltage, and the first interlayer insulating film 81 serving as the other dielectric film can also be formed as to have a small thickness as with the insulating thin film 2. Therefore, by employing these thin dielectric films, it is possible to form the storage capacitor 70 having large capacitance in a still smaller area.

In the electro-optical device according to the present embodiment, as described above, the capacitance of the storage capacitor 70 can be increased while increasing the pixel aperture ratio at the same time. Besides, the degradation in the quality of the displayed image due to the irregular steps on the surface of the alignment film 16 near the pixel electrode 9a can be minimized. Thus it is possible to display a high-quality image with high brightness and high contrast with less flicker, ghost, and crosstalk which cause degradation in the image quality.

Referring again to FIG. 3, each pixel switching TFT 30 has an LDD (Lightly-doped Drain) structure including a scanning line 3a, a channel region 1a' in a semiconductor layer 1a wherein a channel is formed by an electric field applied by the scanning line 3a, an insulating thin film 2 for electrically isolating the scanning line 3a and the semiconductor layer 1a from each other, a data line 6a, a lightly-doped source region 1b and a lightly-doped drain region 1c formed in the semiconductor layer 1a, and a heavily-doped source region 1d and a heavily-doped drain region 1e formed in the semiconductor layer 1a. The heavily-doped drain region 1e is connected to a corresponding one of a plurality of pixel electrodes 9a via a first intermediate conductive layer 80. In the present embodiment, the data line 6a is formed of an opaque and electrically conductive thin film. Specific examples employable as such a thin film include a metal film with low resistance such as an aluminum film and an alloy film such as a metal silicide film.

In the first interlayer insulating film 81 formed on the scanning line 3a and the capacitance line 3b, a contact hole 5 and a first contact hole 8a are formed such that the contact hole 5 passes therethrough until reaching the heavily-doped source region 1d, and the first contact hole 8a passes therethrough until reaching the heavily-doped drain region 1e.

On the first interlayer insulating film 81, a first intermediate conductive layer 80 and a second intermediate conductive layer 180 are formed, wherein the first intermediate conductive layer 80 is connected to the heavily-doped drain region 1e via the first contact hole 8a, and the second intermediate conductive layer 180 is connected to the capacitance line 3b via the contact hole 18a.

A second interlayer insulating film 4 is formed on the first intermediate conductive layer 80. The data line 6a is formed on the second interlayer insulating film 4. The data line 6a is electrically connected to the heavily-doped source region 1d via the contact hole 5 formed in the second interlayer insulating film 4.

Furthermore, a third interlayer insulating film 7 is formed on the data line 6a and the second interlayer insulating film 4, wherein a second contact hole 8b is formed through the third interlayer insulating film 7 such that the second contact hole 8b reaches the first intermediate conductive layer 80. The pixel electrode 9a is electrically connected to the first intermediate conductive layer 80 via the second contact hole 8b. The pixel electrode 9a is formed on the upper surface of the third interlayer insulating film 7 formed in the above described manner.

Although it is preferable that the pixel switching TFT 30 be formed into the LDD structure as described above, the pixel switching TFT 30 may also be formed into an offset structure in which no impurities are implanted into the lightly-doped source region 1b and the lightly-doped drain region 1c. The pixel switching TFT 30 may also be of a self-alignment type in which a heavily-doped of impurity is implanted using a gate electrode realized by a part of the scanning line 3a as a mask, thereby forming the heavily-doped source regions 1d and the heavily-doped drain region 1e.

Furthermore, although in the present embodiment, the pixel switching TFT 30 is formed into the single gate structure having only one gate electrode which is formed, using a part of the scanning line 3a, between the heavily-doped source region 1d and the heavily-doped drain region 1e, two or more gate electrodes may be formed therebetween. In the case where the TFT 30 is formed into the dual or triple gate structure, a leakage current between the channel and the source or the drain region and thus an off-current can be reduced. If at least one of these gate electrodes is formed into the LDD or offset structure, a further reduction in the off-current can be achieved, and thus a highly reliable switching device can be obtained.

The first intermediate conductive layer 80 is described in further detail below.

As shown in FIGS. 2 and 3, the first intermediate conductive layer 80 is disposed between the semiconductor layer 1a and the pixel electrode 9a, and is used to electrically connect the heavily-doped drain region 1e and the pixel electrode 9a via the first contact hole 8a and the second contact hole 8b.

In this structure, the diameters of the first contact hole 8a and the second contact hole 8b can be reduced compared to the structure in which the pixel electrode 9a and the semiconductor layer 1a are connected via a single hole. That is, when a single contact hole is used, it is necessary to form the contact hole with a large depth. However, if the etching selectivity is low, the etching accuracy becomes worse with increasing depth. Therefore, in order to avoid over etching through the semiconductor layer 1a having very small thickness of about 50 nm, it is necessary to use dry etching capable of precisely forming the contact hole with a small diameter, and it is necessary to stop the dry etching before the contact hole is entirely formed. After stopping the dry etching, the remaining part is etched by means of wet etching so that the contact hole finally reaches the semiconductor layer 1a. Alternatively, it is necessary to dispose an additional film serving as an etching stopper at which the dry etching stops.

In contrast, in the present embodiment in which the pixel electrode 9a and the heavily-doped drain region 1e are connected via a series of two contact holes, that is, the first contact hole 8a and the second contact hole 8b, the first contact hole 8a and the second contact hole 8b can be formed separately by a dry-etching process. When a mixture of wet and dry etching is employed, the distance of the contact holes etched by wet etching can be reduced. After performing dry etching, wet etching may be performed to obtain a slightly tapered shape in the first contact hole 8a and the second contact hole 8b. In the present embodiment, as described above, it is possible to reduce the diameters of the first contact hole 8a and the second contact hole 8b, and it is also possible to reduce the steps, which are formed on the surface of the first intermediate conductive layer 80, at a location where the first contact hole 8a is formed and thus the pixel electrode 9a disposed thereon has a smoother surface. Furthermore, the steps formed on the surface of the pixel electrode 9a at a location where the first contact hole 8a is formed are minimized, and thus the pixel electrode 9a in this area can be planarized in a better fashion. In the present embodiment, by forming the first interlayer insulating film 81 so as to have a small thickness, it is possible to further reduce the diameter of the second contact hole 8b.

Specific examples of the material for the first intermediate conductive layer 80 include, as with the first light-shielding film 11a, an opaque refractory metal such as Ti, Cr, W, Ta, Mo, or Pb or an alloy or metal silicide containing at least one of the refractory metals described above. The use of such a refractory metal ensures that when the refractory metal and the pixel electrode 9a formed of the ITO film come into contact with each other, the refractory metal is not corroded, and thus a good electrical contact can be formed between the first intermediate conductive layer 80 and the pixel electrode 9a via the second contact hole 8b. Alternatively, the first intermediate conductive layer 80 may be formed of a conductive polysilicon film. Also in this case, the first intermediate conductive layer 80 can serve to increase the capacitance of the storage capacitor 70 and can also serve to provide an intermediate electrical connection. In particular, the use of the polysilicon as the first intermediate conductive layer 80 results in a reduction in thermal stress between the first interlayer insulating film 81, and thus formation of cracks can be prevented.

The thickness of the first intermediate conductive layer 80 is preferably set within the range from 50 nm to 500 nm. When the thickness of the first intermediate conductive layer 80 is selected to be about 50 nm, there is a less possibility that over etching occurs during a production process of forming the second contact hole 8b. On the other hand, when the thickness of the first intermediate conductive layer 80 is selected to be about 500 nm, substantially no problems occur in terms of the steps on the surface of the pixel electrode 9a, or planarization can be accomplished rather easily. Note that when the first intermediate conductive layer 80 is formed of a refractive metal or an alloy of refractive metals, there is a large difference in etching rate between the first intermediate conductive layer 80 and the interlayer insulating film, and thus there is little possibility that over etching occurs during the dry etching process.

Besides, in the present embodiment, the first intermediate conductive layer 80 and the second intermediate conductive layer 180 are formed of a refractive metal film having an ability to block light. Therefore, the channel region 1a' of the TFT 30 and its adjacent areas can be blocked from illumination of light not only by the second light-shielding film 23 on the opposite substrate 20 and the data line 6a on the TFT array substrate 10, but also by the first intermediate conductive layer 80 and the second intermediate conductive layer 180. This makes it possible to prevent a change in the transistor characteristic even if very high intensity of light is incident on the opposite substrate 20. Therefore, the electro-optical device according to the present embodiment is particularly useful when it is used in applications, such as a light valve of a projector, in which very high intensity of light is incident.

Furthermore, in the present embodiment, the first intermediate conductive layer 80 and the second intermediate conductive layer 180 having the ability to block light are formed so as to have a large width, thereby defining a part of the pixel aperture area. Therefore, in the light-shielding areas in which the first intermediate conductive layer 80 or the second intermediate conductive layer 180 is present, it is not necessary to form the second light-shielding film 23 on the opposite substrate 20, and it is also not necessary to expand the width of the data line 6a to define the aperture area.

In particular, in the light-shielding area along the data line 6a in each pixel, the data line 6a, the capacitance line 3b, and the second intermediate conductive layer 180 are formed in plane view such that the width Wd of the data line 6a, the width Wc of the projecting part of the capacitance line 3b, and the width Wm of the intermediate conductive layer 180 satisfy a condition Wd<Wc<Wm. As a result, light incident on the opposite substrate 20 is doubly blocked by the data line 6a and the second intermediate conductive layer 180 formed on the TFT array substrate 10. In the case where light is blocked only by the data line 6a formed of an aluminum film having high reflectance, projection light or reflected light incident at an oblique angle on the substrate surface is reflected by the inner surface of the data line 6a, and light can finally reach the channel region 1a' or its adjacent regions after multiple reflection. In contrast, in the present embodiment in which the first intermediate conductive layer 80 and the second intermediate conductive layer 180 are formed of a refractive metal film or a polysilicon film having low reflectance, and the second intermediate conductive layer 180 has a width greater than the width of the data line 6a (Wd<Wm), multiple reflection of light is reduced. Therefore, the structure according to the present embodiment is very useful in applications, such as a light valve of a projector, in which there is incident light or reflected light with very high intensity.

Furthermore, in the present embodiment, an edge portion extending along the data line 6a of the pixel electrode 9a overlaps with an edge portion of the second intermediate conductive layer 180, but the edge portion extending along the data line 6a of the pixel electrode 9a does not substantially overlap with the edge portion of the data line 6a. That is, the light-shielding area is defined by the second intermediate conductive layer 180, and the overlap between the data line 6a and the pixel electrode 9a is minimized, thereby greatly reducing the parasitic capacitance between the source and the drain. Thus, it is possible to prevent the reduction in contrast, and it is also possible to greatly suppress ghost and crosstalk which cause degradation in the image quality.

In the present embodiment, the thickness of the second interlayer insulating film 4 between the data line 6a and the second intermediate conductive layer 180 is preferably selected within the range from 500 to 2000 nm. Because the film thickness is selected within the above range, and, besides, the second intermediate conductive layer 180 is connected to the capacitance line 3b via the contact hole 18a, the parasitic capacitance between the data line 6a and the second intermediate conductive layer 180 also becomes negligibly small. The specific film thickness can be determined depending upon the required image quality or specifications, experimentally or on the basis of theoretical calculation or simulation.

In the present embodiment, the first light-shielding film 11a preferably includes a part which extends into the peripheral area on the TFT array substrate 10 and which is connected to a constant potential line. Thus, the first light-shielding film 11a is maintained at a constant voltage, and the characteristic of the TFT 30 formed on the first light-shielding film 11a via the underlying insulating film 12 is not influenced by a change in the potential of the first light-shielding film 11a. The constant potential source used for the above purpose may be selected from the group consisting of the negative and positive constant potential sources supplied to the scanning line driving circuit and the data line driving circuit, the ground power source, and the constant potential source supplied to the opposite electrode so as to maintain the conductive film 90a at a fixed potential. Alternatively, for the above purpose, the first light-shielding film 11a may be electrically connected to the capacitance line 3a. This structure is also advantageous in that the interconnections used to form the storage capacitor can be formed in a redundant fashion.

(Production Process of the Electro-Optical Device)

Referring to FIGS. 5(A)-6(F), a production process of the electro-optical device having the above-described structure according to the first embodiment is described below. FIGS. 5(A)-6(F) are cross-sectional views taken, as in FIG. 3, along line III-III' of FIG. 2, and illustrating various layers on the TFT array substrate for the respective processing steps.

First, as shown in FIG. 5(A), a TFT array substrate 10 formed of quartz, glass, or silicon is prepared. It is desirable that the TFT array substrate 10 be subjected to a heat treatment at a temperature in the range from about 900° C. to 1300° C. in an inert gas ambient such as $N_2$ (nitrogen) so that the TFT array substrate 10 will have less stress during high temperature processes which will be performed later. That is, before the high temperature processes are performed, the TFT array substrate 10 is heat-treated at a temperature equal to or higher than the highest temperature that the TFT array substrate 10 will encounter during the production process. After completion of the heat treatment, metal such as Ti, Cr, W, Ta, Mo, or Pb or an alloy of metals such as a metal silicide is deposited over the entire surface of the TFT array substrate 10 by means of sputtering or the like, thereby forming an opaque conductive film having a thickness of preferably 100 nm to 500 nm, and more preferably about 200 nm. The deposited conductive film is then etched using a photolithography technique so as to form the first light-shielding film 11a. An anti-reflection film formed of polysilicon or the like may be disposed on the first light-shielding film 11a to reduce the reflection at the surface thereof.

Thereafter, as shown in FIG. 5(B), an underlying insulating film 12 of silicate glass such as NSG, PSG, BSG, or BPSG, silicon nitride, or silicon oxide is formed on the first light-shielding film 11a by means of atmospheric pressure or low pressure CVD process using TEOS (tetraethyl orthosilicate) gas, TEB (tetraethyl borate) gas, or TMOP (tetramethyl oxyphosphorate) gas. The thickness of the underlying insulating film 12 is selected to be, for example, within the range of about 500 nm to 2000 nm.

Then as shown in FIG. 5(C), an amorphous silicon film 1a is formed on the underlying insulating film 12 by means of low pressure CVD (at a pressure of about 20 to 40 Pa) using monosilane or disilane gas at a flow rate of about 400 to 600 cc/min at a temperature of about 450° C. to 550° C., and more preferably at about 500° C. Thereafter, heat treatment is performed in a nitrogen ambience at a temperature of about 600 to 700° C. for 1 to 10 hours, and more preferably for 4 to 6 hours, thereby growing the amorphous silicon film to a thickness of about 50 to 200 nm, and more preferably about 100 nm, by means of solid phase growth. Specific examples of the solid phase growth techniques include heat treatment using RTA (Rapid Thermal Anneal) and laser anneal using excimer laser.

In the case where the pixel switching TFT 30 is formed into an n-channel type, the channel region may be slightly-doped with an impurity of a group V element such as Sb (antimony), As (arsenic), or P (phosphorus) using ion implantation. When the pixel switching TFT 30 is formed into a p-channel type, the channel region may be slightly-doped with an impurity of a group III element such as B (boron), Ga (gallium), or In (indium) using ion implantation. The polysilicon film may also be formed directly by means of low pressure CVD or the like without forming an amorphous silicon film as an intermediate material. Alternatively, the polysilicon film may be formed by first implanting silicon ions into a polysilicon film deposited by means of low pressure CVD or the like so as to converts it into an amorphous state and then recrystalizing it by means of heat treatment or the like.

Thereafter, as shown in FIG. 5(D), the semiconductor layer 1a of the pixel switching TFT 30 is thermally oxidized at a temperature of about 900 to 1300° C., and more preferable about 1000° C., so as to form an insulating thin film 2 having a structure of a single layer of thermal silicon oxide film with a rather small thickness in the range of about 20 to 150 nm. An additional insulating film of a high-temperature silicon oxide film (HTO film) or silicon nitride film with a rather thin thickness of about 50 nm may be formed by means of low pressure CVD after thinning the thermal silicon oxide film to a thickness equal to or smaller than about 30 nm, thereby forming the insulating thin film 2 in the form of a multilayer including the thermal silicon oxide film and the additional insulating thin film. When a large-sized substrate with a diameter of 200 mm or greater is employed, if the multilayer structure is employed, it is possible to reduce the time of the high temperature oxidation process, and thus it is possible to prevent the large-sized substrate from being bent by heat.

Through the above processing steps, the thickness of the semiconductor layer 1a becomes about 30 to 150 nm, and more preferably about 35 to 50 nm, and the thickness of the insulating thin film 2 becomes about 20 to 150 nm, and more preferably about 30 to 100 nm.

Thereafter, as shown in FIG. 5(E), a resist layer 500 may be formed using a photolithography process and an etching process such that the semiconductor layer 1a is covered with the resist layer 500 except for areas which will become a first capacitance electrode 1f, and then, for example, P ions may be doped at a dose of about $3\times10^{12}/cm^2$ thereby reducing the resistance of the first capacitance electrode 1f.

Next, as shown in FIG. 6(A), a scanning line 3a and a capacitance line 3b are formed by means of an etching process using a resist mask formed by a photolithography process. In the case where the pixel switching TFT 30 is formed into the n-channel type, an impurity of a group V element such as P is doped at a low dose (for example, P ions are doped at a dose of 1 to $3\times10^{13}/cm^2$ using a gate electrode realized by a part of the scanning line 3a as a mask, thereby forming a lightly-doped source region 1b and a lightly-doped drain region 1c in the semiconductor layer 1a). Through this step, the part of the semiconductor layer 1a just under the scanning line 3a becomes a channel region 1a'.

Thereafter, as shown in FIG. 6(B), after forming a resist layer 600 on the scanning line 3a using a mask with a width greater than the width of the scanning line 3a, an impurity of a group V element such as P is doped at a high dose (for example, P ions are doped at a dose of 1 to $3\times10^{15}/cm^2$ thereby forming a heavily-doped source region 1d and a heavily-doped drain region 1e). In the case where the pixel switching TFT 30 is formed into the p-channel type, an impurity of a group III element such as B is doped into the semiconductor layer 1a in the step of forming the lightly-doped source region 1b and the lightly-doped drain region 1c and also in the step of forming the heavily-doped source region 1d and the heavily-doped drain region 1e.

As shown in FIG. 6(C), after removing the resist layer 600, a high temperature silicon oxide film (HTO) or silicon nitride film with a small thickness equal to or less than 200 nm is deposited on the scanning line 3a and the capacitance line 3b by means of low pressure CVD or plasma-assisted CVD, thereby forming a first interlayer insulating film 81. Alternatively, before depositing the above insulating film, a thin oxide film having a high breakdown voltage and having a low density of defects is firstly formed by performing a high temperature process upon the TFT array substrate 10 made of quartz or the like, and then the above-described insulating film may be deposited thereby forming the first interlayer insulating film 81 having a multilayer structure.

As shown in FIG. 6(D), a first contact hole 8a, via which the first intermediate conductive layer 80 and the heavily-doped drain region 1e will be electrically connected to each other, is formed through the first interlayer insulating film 81 by means of dry etching such as reactive-ion etching or reactive-ion beam etching. The dry etching process has strong anisotropy, and thus it can be used to form the contact hole 8a having a small diameter. Alternatively, a combination of dry etching and wet etching may be employed to form the contact hole 8a. In this case, it becomes easy to precisely form the contact hole 8a without resulting in over-etching which could cause the contact hole 8a to further extend through semiconductor layer 1a. Wet etching is also useful to form the contact hole 8a so as to have a tapered shape which allows achievement of a better electrical contact. In the present embodiment, a contact hole 18a, via which the second intermediate conductive layer 180 and the capacitance line 3b will be electrically connected to each other, is also formed at the same time as the first contact hole 8a. The formation of the contact holes 18a and 8a at the same time prevents an increase in the number of processing steps.

Thereafter, as shown in FIG. 6(E), as in the step of forming the first light-shielding film 11a, metal such as Ti, Cr, W, Ta, Mo, or Pb or an alloy of metals such as a metal silicide is deposited on the first interlayer insulating film 81 means of sputtering or the like. The deposited layer is then subjected to a photolithography and etching process thereby forming a first intermediate conductive layer 80. A second intermediate conductive layer 180 is also formed at the same time in this step. An anti-reflection film formed of polysilicon or the like may be disposed on the first intermediate conductive layer 80 and the second intermediate conductive layer 180 to reduce the reflection at the surface thereof. In order to achieve low contact resistance between the heavily-doped drain region 1e and the first intermediate conductive layer 80, the first intermediate conductive layer 80 and the second intermediate conductive layer 180 may be formed into a two-layer structure consisting of a bottom layer of polysilicon and a top layer of refractive metal.

As shown in FIG. 6(F), the upper surface, having physical steps, of the multilayer structure consisting of the scanning line 3a, the capacitance line 3b, the first interlayer insulating film 81, and the underlying insulating film 12 is covered with a second interlayer insulating film 4 of silicate glass such as NSG, PSG, BSG, or BPSG, silicon nitride, or silicon oxide formed by means of atmospheric pressure or low pressure CVD using TEOS gas. After forming the second interlayer insulating film 4, heat treatment may be performed at about 1000° C. to activate the semiconductor layer 1a.

After that, a contact hole 5 used for connection to the data line 6a is formed in the second interlayer insulating film 4 and the first interlayer insulating film 81, and the insulating thin film 2, by means of etching. The data line 6a is then formed thereon by depositing a low-resistance metal film such as Al or metal silicide with a thickness of about 100 to 500 nm by means of sputtering or the like. Furthermore, a third interlayer insulating film 7 is formed thereon by means of CVD or the like.

A second contact hole 8b is then formed in the third interlayer insulating film 7 and the second interlayer insulating film 4 by means of etching. Finally, a pixel electrode 9a of ITO is formed such that it is electrically connected to the first intermediate conductive layer 80 via the second contact hole 8b. In this step shown in FIG. 6(F), it is desirable that other contact holes for connection of the scanning line 3a or the capacitance line 3b to an interconnection (not shown) in a peripheral area of the substrate be formed as the same time as the contact hole 5. The thickness of the data line 6a is preferably selected within the range of about 100 to 500 nm, and more preferably about 300 nm. The thickness of the third interlayer insulating film 7 is preferably selected within the range of about 500 to 1500 nm. Instead of forming the contact hole 8b using dry etching such as reactive-ion etching or reactive-ion beam etching, the contact hole 8b may be formed using wet etching so as to obtain a tapered shape. The thickness of the pixel electrode 9a is preferably selected within the range of about 50 to 200 nm. In the case where the present electro-optical device is used in a liquid crystal device of the reflective type, the pixel electrode 9a may be formed of a material having high reflectance and high ability to block light, such as aluminum.

As described above, the production process according to the present embodiment allows the electro-optical device according to the present embodiment to be produced rather easily. Besides, because the semiconductor layer 1a of the pixel switching TFT 30 is formed of a polysilicon film, peripheral circuits can be formed at the same time as the pixel switching TFT 30.

In the production process described above, when the pixel electrode 9a is formed, the surface of the second interlayer insulating film 4 and the third interlayer insulating film 7 may be planarized by using a CMP method or the like so as to obtain a flat film surface. Alternatively, after etching particular regions of the TFT array substrate 10 so as form recesses, the above-described process may be performed in a similar so that the surface of the third interlayer insulating film 7 eventually becomes flat. Still alternatively, the second interlayer insulating film 4 or the underlying insulating film 12 may be embedded in a recessed region. If the surface of the underlying film has been planarized before forming the pixel electrode 9a in the above-described manner, it becomes possible to minimize disclination in the liquid crystal, thereby ensuring that no degradation in the image quality, such as a reduction in contrast, occurs.

Second Exemplary Embodiment

Figure 7:
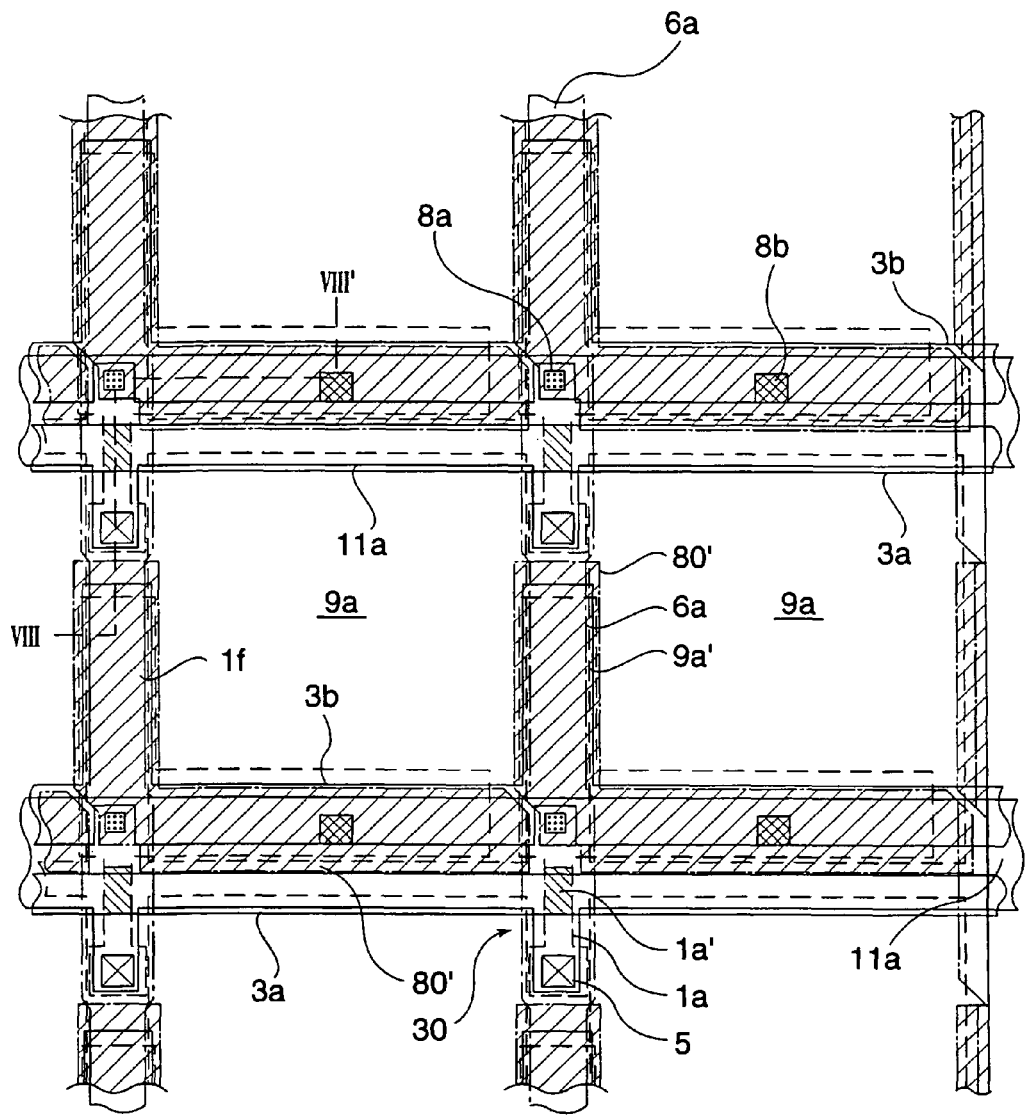
FIG. 7 is a plan view illustrating some pixels formed at adjacent locations on a TFT array substrate of a liquid crystal device according to a second exemplary embodiment, wherein data lines, scanning lines, and pixel electrodes are formed on the TFT array substrate.
Figure 8:
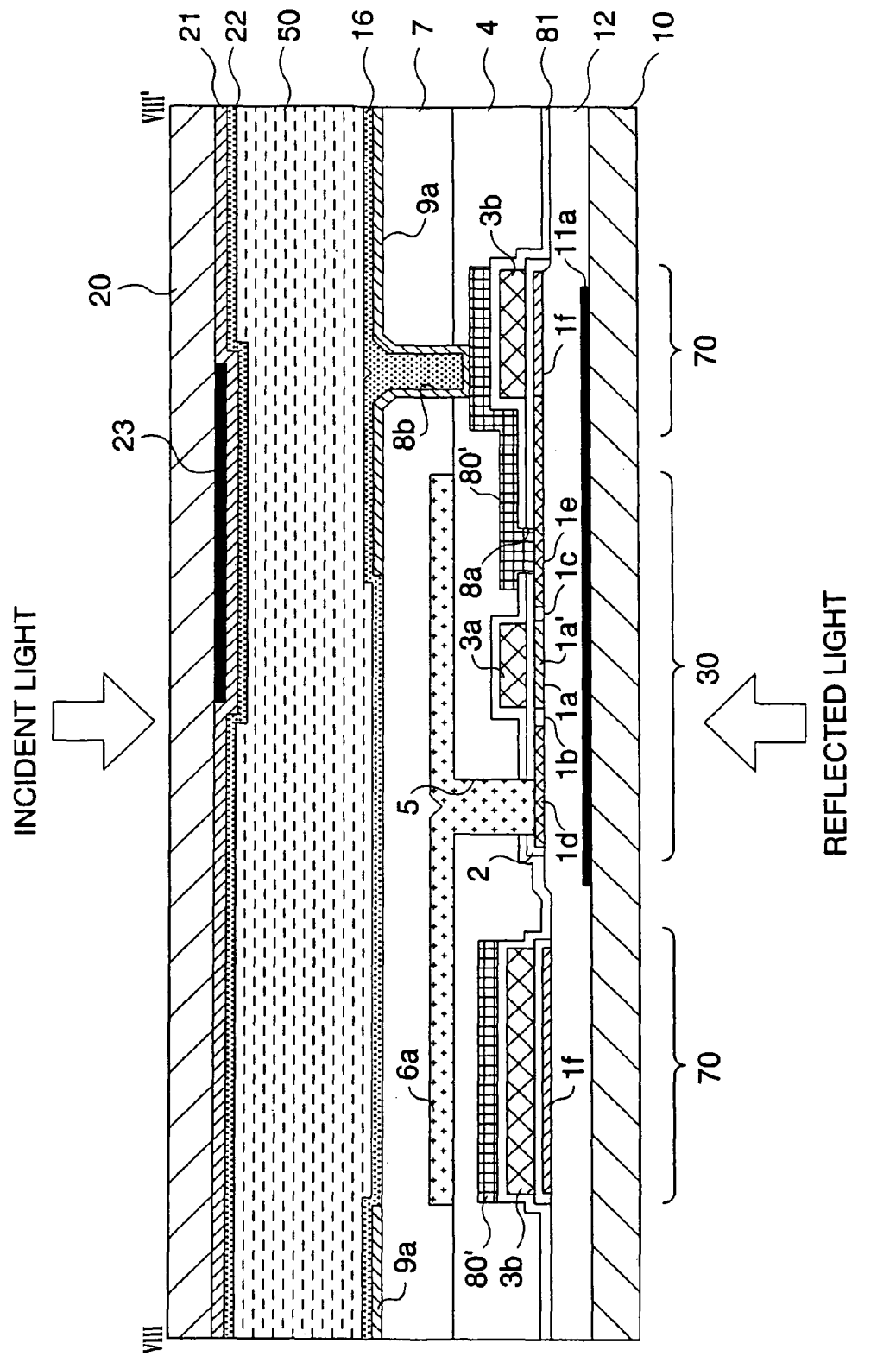
FIG. 8 is a cross-sectional view taken along line VIII-VIII' of FIG. 7.

The structure of an electro-optical device in the form of a liquid crystal device according to a second exemplary embodiment of the present invention is described below with reference to FIGS. 7 and 8. FIG. 7 is a plan view illustrating some pixels formed at adjacent locations on a TFT array substrate on which data lines, scanning lines, and pixel electrodes are also formed. FIG. 8 is a cross-sectional view taken along line VIII-VIII' of FIG. 7. In FIG. 8, in order to provide an easily understandable view, the respective layers and members are displayed in different magnification ratios.

As shown in FIGS. 7 and 8, the second embodiment is similar to the first embodiment except that the first intermediate layer 80 and the second intermediate layer 180 in the first embodiment are combined into a single layer as an intermediate conductive layer 80' in the form of an L shape for each pixel in the second embodiment, and, correspondingly, the contact hole 18a used in the first embodiment to connect the second intermediate conductive layer 180 and the capacitance line 3b is not formed in the second embodiment. In FIGS. 7 and 8, similar constituent elements to those in the first embodiment described above with reference to FIGS. 2 and 3 are denoted by similar reference numerals and they are not described in further detail herein.

That is, in this second embodiment, the intermediate conductive layer 80' overlaps with a part, extending along the data line 6a, of the capacitance line 3b via the second interlayer insulating film 4, thereby forming a storage capacitor 70. That is, in the light-shielding area formed along the data line 6a, the first capacitor electrode 1f extending from the heavily-doped drain region 1e of the semiconductor layer 1a and the capacitance line 3b are disposed such that they face each other, and the capacitance line 3b and the intermediate conductive layer 80' are disposed such that they face each other. Thus, in this second embodiment, the storage capacitor 70 is formed vertically stacked also in the light-shielding area along the data line 6a. This makes it possible to form the storage capacitor with large capacitance in a small area in a highly efficient fashion. This technique is very useful in particular in applications in which a large pixel aperture ratio and a small pixel pitch are required.

Third Exemplary Embodiment

Figure 9:
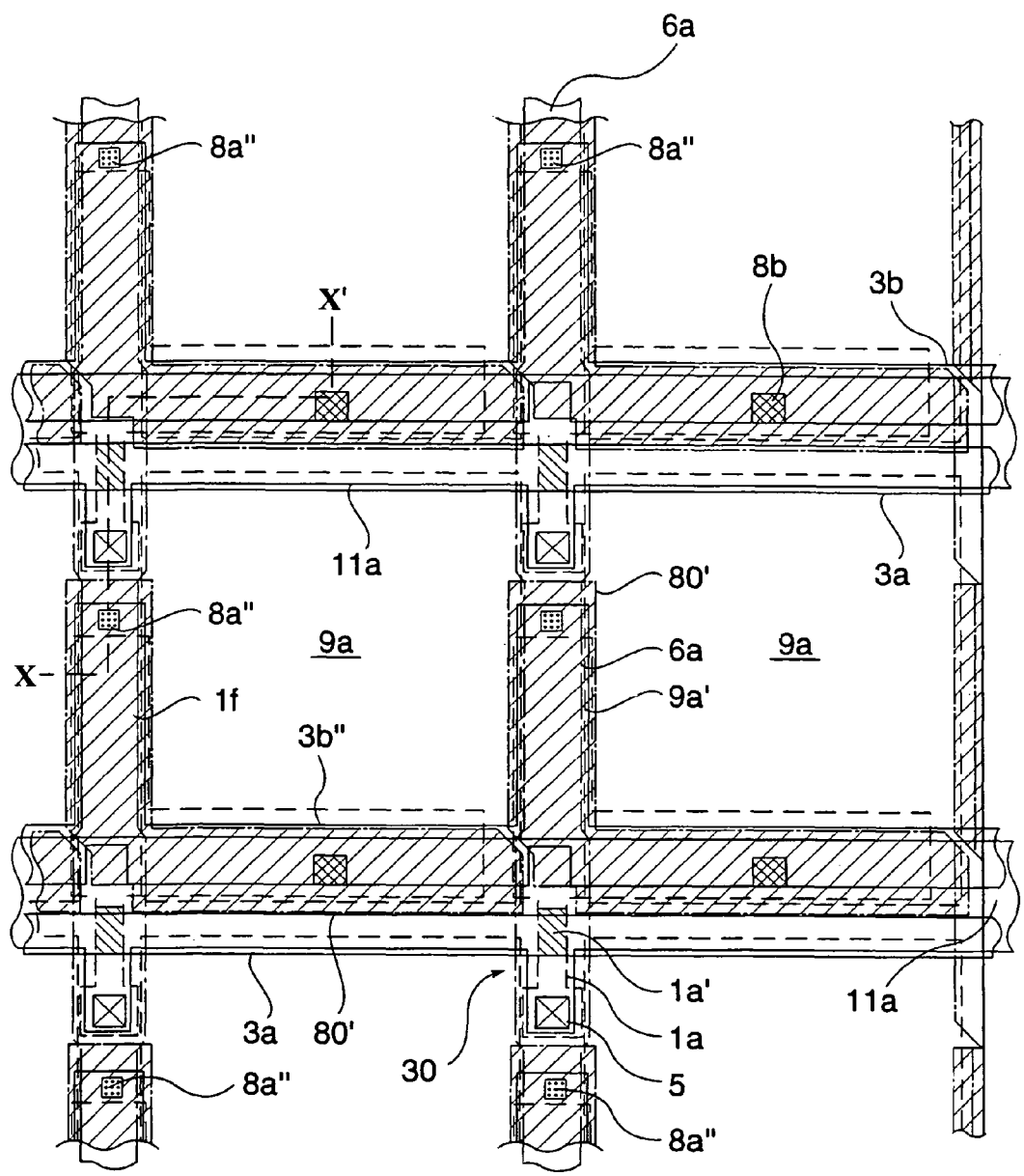
FIG. 9 is a plan view illustrating some pixels formed at adjacent locations on a TFT array substrate of a liquid crystal device according to a third exemplary embodiment, wherein data lines, scanning lines, and pixel electrodes are formed on the TFT array substrate.
Figure 10:
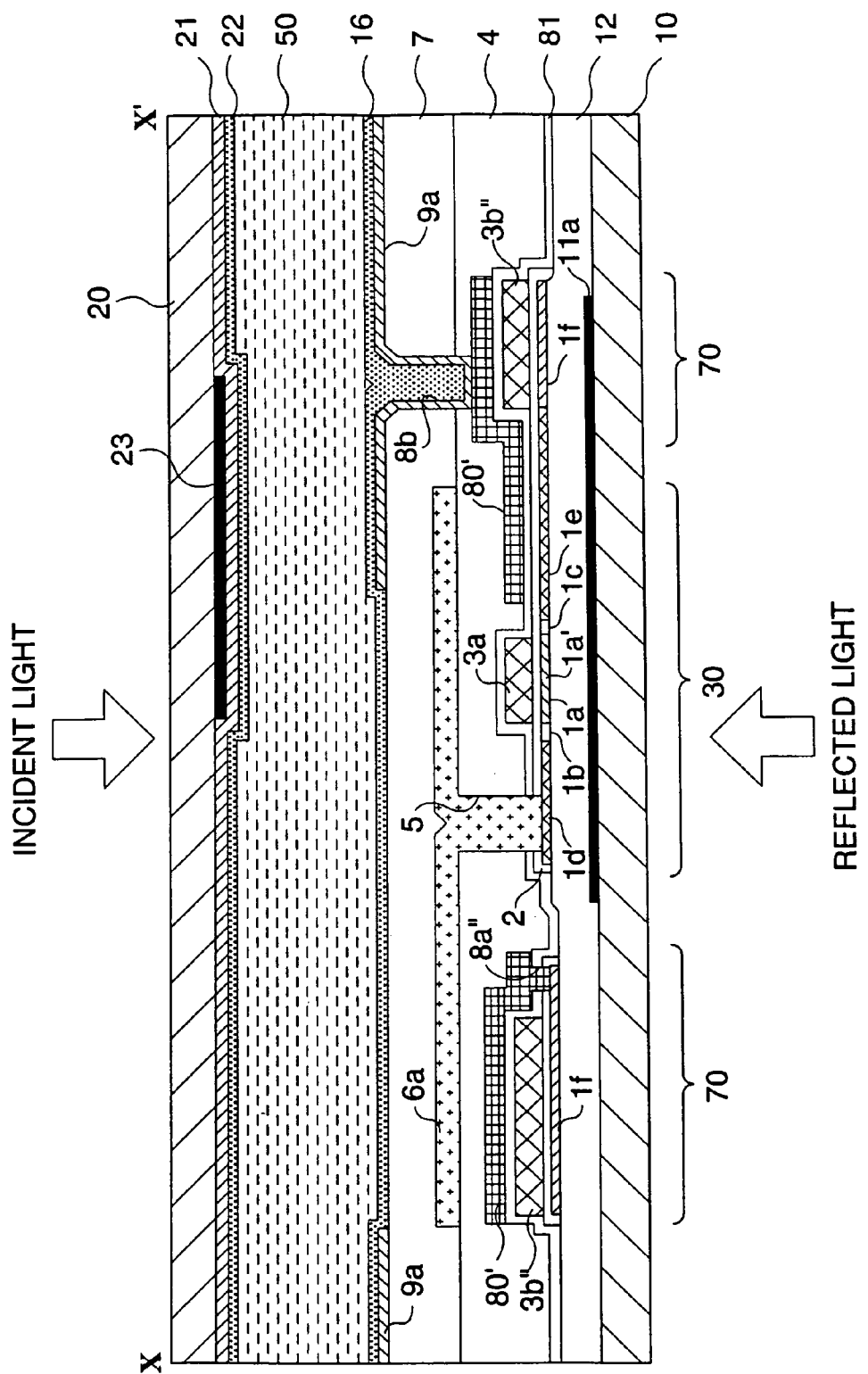
FIG. 10 is a cross-sectional view taken along line X-X' of FIG. 9.

The structure of an electro-optical device in the form of a liquid crystal device according to a third exemplary embodiment of the present invention is described below with reference to FIGS. 9 and 10. FIG. 9 is a plan view illustrating some pixels formed at adjacent locations on a TFT array substrate on which data lines, scanning lines, and pixel electrodes are also formed. FIG. 10 is a cross-sectional view taken along line X-X' of FIG. 9. In FIG. 10, in order to provide an easily understandable view, the respective layers and members are displayed in different magnification ratios.

In FIGS. 9 and 10, similar constituent elements to those in the first embodiment described above with reference to FIGS. 2 and 3 or to those in the second embodiment described above with reference to FIGS. 7 and 8 are denoted by similar reference numerals and they are not described in further detail herein.

In this third embodiment, the intermediate conductive layer 80' is disposed such that it overlaps with a part, extending along the data line 6a, of the capacitance line 3b" via the second interlayer insulating film 4 so that the storage capacitor 70 is also formed in this area. That is, in the light-shielding area formed along the data line 6a, the first capacitor electrode 1f formed by extending the heavily-doped drain region 1e of the semiconductor layer 1a and the capacitance line 3b" can be disposed such that they face each other, and the capacitance line 3b" and the intermediate conductive layer 80' can be disposed such that they face each other. Besides, unlike the second embodiment, because the first contact hole 8a" is formed so that the intermediate conductive layer 80' and the semiconductor layer 1a are electrically connected to each other via the first contact hole 8a" at a location farther away, in plan view, from the end of the part, extending along the data line 6a, of the capacitance line 3b", it is not necessary to form a partially narrowed portion in the capacitance line 3b". This allows further increases in the pixel aperture ratio and the capacitance of the storage capacitor 70.

In the respective embodiments described above, the contact holes may be formed to have the shape of circles, rectangles, or other polygons. In particular, the circular shape has the advantage that formation of cracks in the interlayer insulating films or the like, in areas near the contact holes, can be prevented.

Fourth Exemplary Embodiment

Figure 11:
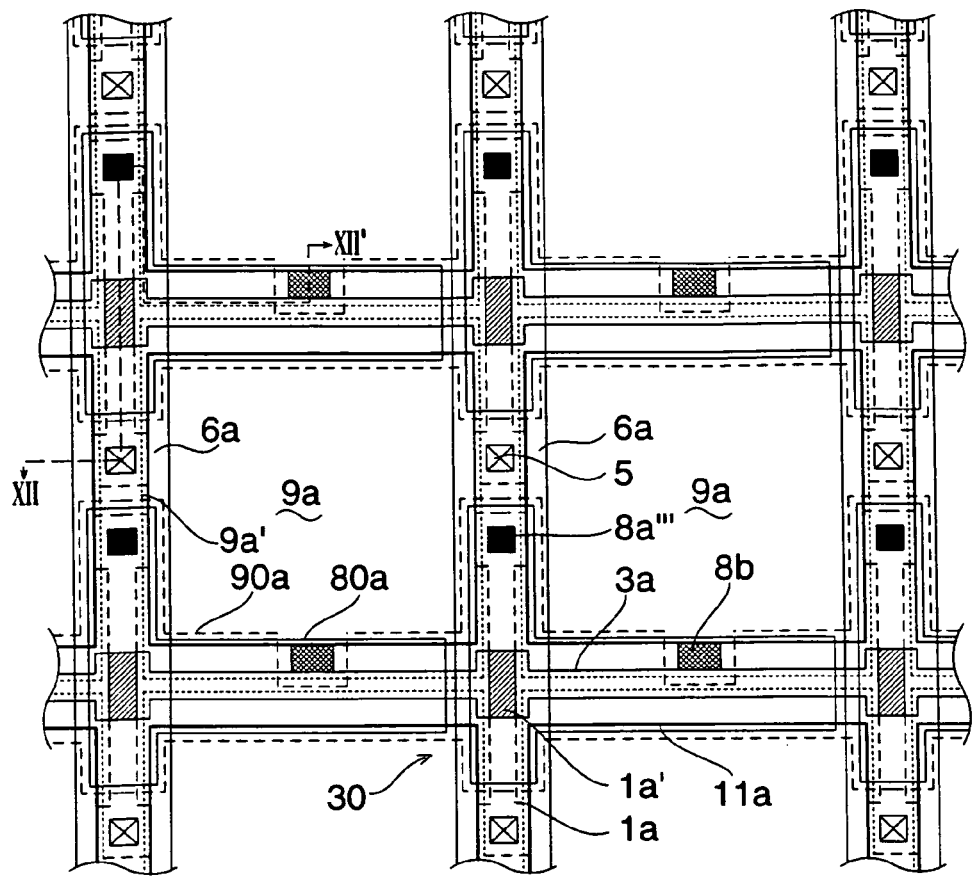
FIG. 11 is a plan view illustrating some pixels formed at adjacent locations on a TFT array substrate of a liquid crystal device according to a fourth exemplary embodiment, wherein data lines, scanning lines, and pixel electrodes are formed on the TFT array substrate.
Figure 12:
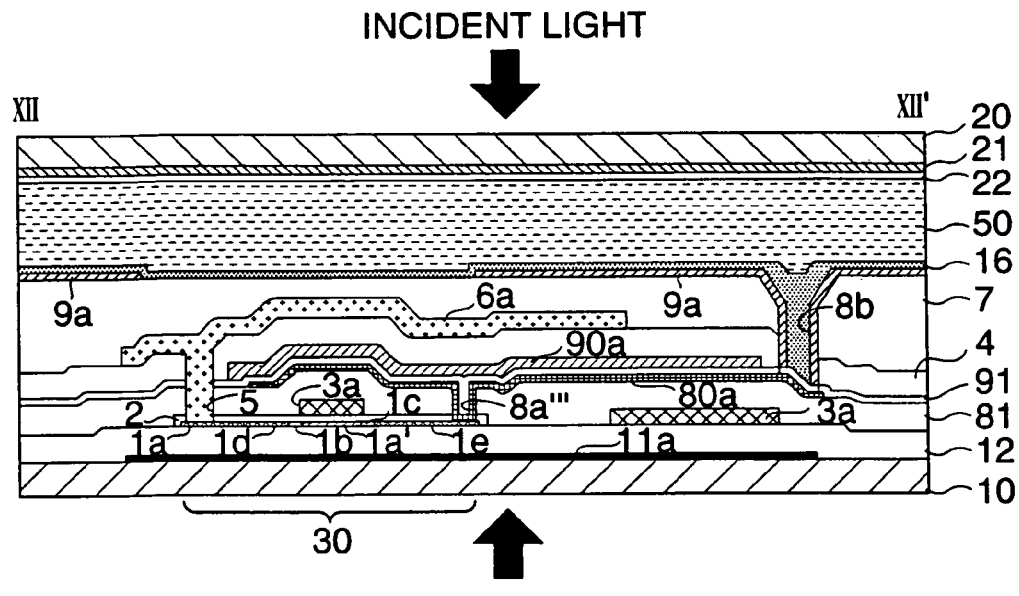
FIG. 12 is a cross-sectional view taken along line XII-XII' of FIG. 11.

The structure of an electro-optical device in the form of a liquid crystal device according to a fourth exemplary embodiment of the present invention is described below with reference to FIGS. 11 and 12. FIG. 11 is a plan view illustrating some pixels formed at adjacent locations on a TFT array substrate on which data lines, scanning lines, and pixel electrodes are also formed. FIG. 12 is a cross-sectional view taken along line XII-XII' of FIG. 11. In FIG. 12, in order to provide an easily understandable view, the respective layers and members are displayed in different magnification ratios. Similar elements to those in the first embodiment are denoted by similar reference numerals and they are described in further detail herein.

In this fourth embodiment, as shown in FIG. 11, the scanning line 3a and the data line 6a are disposed at a substantially central location in the non-display area. The semiconductor layer 1a is disposed below the data line 6a such that the semiconductor layer 1a and the scanning line 3a cross each other. As shown in FIG. 12, the data line 6a and the heavily-doped source region 1d of the semiconductor layer 1a are electrically connected to each other via the contact hole 5 formed below the data line 6a. The heavily-doped drain region 1e of the semiconductor layer 1a and the intermediate conductive layer 80a are electrically connected to each other via a first contact hole 8a'' formed below the data line 6a. Because the semiconductor layer 1a is disposed below the light-shielding data line 6a, the semiconductor layer 1a is prevented from being directly illuminated with light incident on the side of the opposite substrate 20. Furthermore, the semiconductor layer 1a, the contact hole 5, and the first contact hole 8a'' are formed at locations symmetrical about the center line of the non-aperture area extending along the scanning line 3a and also about the center line of the non-aperture area extending along the data line 6a, thereby making the step shapes symmetrical about the data line 6a. Thus, it is possible to eliminate the difference in loss of light depending upon the rotation direction of the liquid crystal.

Below the semiconductor layer 1a, the first light-shielding film 11a is formed via the underlying insulating film 12. The first light-shielding film 11a is formed in a matrix along the data line 6a and the scanning line 3a. The semiconductor layer 1a is disposed on an inner side of the first light-shielding film 11a, and thus the semiconductor layer 1a is prevented from being directly illuminated with light reflected by the TFT array substrate 10.

The intermediate conductive layer 80a is formed of a conductive film including a polysilicon film or a refractive metal so as to have a T-like shape extending, in the intermediate layer between the semiconductor layer 1a and the pixel electrode 9a, along the scanning line 3a and the data line 6a. The intermediate conductive layer 80a serves as a buffer for electrically connecting the semiconductor layer 1a and the pixel electrode 9a with each other. More specifically, the heavily-doped drain region 1e of the semiconductor layer 1a and the intermediate conductive layer 80a are electrically connected to each other via the first contact hole 8a'', and the intermediate conductive film 80a and the pixel electrode 9a are electrically connected to each other via the second contact hole 8b. In this structure, the presence of the intermediate conductive layer 80a having a large etching selectivity makes it possible to prevent the semiconductor layer 1a from being etched during the etching process for forming the contact hole in the interlayer insulating film, even when the depth of the contact hole is large. Similarly, in the contact hole 5 via which the data line 6a and the heavily-doped source region 1d of the semiconductor layer 1a are electrically connected to each other, there may be provided an intermediate conductive layer formed of the same film as the intermediate conductive layer 80a.

Furthermore, in the fourth embodiment, an interlayer insulating film 91 is formed on the intermediate conductive layer 80a, and a light-shielding conductive film 90a is formed on the interlayer insulating film 91. The light-shielding conductive film 90a is disposed such that it extends along the scanning line 3a into the outside of the image display area such that the intermediate conductive film 80a is covered with the conductive film 90a except for the second contact hole 8b, and the conductive film 90a is electrically connected to one of the negative and positive constant potential sources supplied to the scanning line driving circuit and the data line driving circuit, the ground power source, and the constant potential source supplied to the opposite electrode so as to maintain the conductive film 90a at a fixed potential. Thus, the storage capacitor 70 shown in FIG. 1 is formed with the intermediate conductive layer 80a serving as one capacitor electrode and the light-shielding conductive film 90a serving as the opposite capacitor electrode. Herein, the interlayer insulating film 91 serves as a dielectric film of the storage capacitor 70. Because the interlayer insulating film 91 is formed for dedicated use as the dielectric film of the storage capacitor 70, the interlayer insulating film 91 can be thinned to a smallest possible thickness which does not cause a leakage current between the intermediate conductive layer 80a and the light-shielding conductive film 90a, so as to increase the capacitance of the storage capacitor 70. Furthermore, in the present embodiment, if the interlayer insulating film 81 is formed so as to have a large thickness, it becomes possible to form the intermediate conductive layer 80a so as to extend to a location above the TFT 30 or the scanning line 3a thereby efficiently increasing the capacitance of the storage capacitor 70. In the fourth embodiment, the capacitor electrode formed by extending the semiconductor layer 1a is not employed. This makes it unnecessary to form the capacitor electrode and the capacitance line to form the storage capacitor using the same film as that used to form the scanning line 3a. Therefore, as shown in FIG. 11, the scanning line 3a can be disposed at a substantially middle point in the non-aperture area defined by the light-shielding conductive film 90a or the first light-shielding film 11a. Furthermore, because it is not necessary to reduce the resistance of the polysilicon film serving as the semiconductor layer 1a, it is not necessary to implant an impurity into the area where the capacitor electrode is formed, and thus the production process is simplified.

In the fourth embodiment, the channel region 1a' of the TFT 30 is disposed in the area where the scanning line 3a and the data line 6a cross each other so that the channel region 1a' is located at a substantially middle point in the non-aperture area along the data line 6a and the scanning line 3a. As a result, the channel region 1a' is disposed at the location which most effectively prevents the channel region 1a' from being illuminated with light incident on the opposite substrate 20 or light reflected from the TFT array substrate 10, whereby the leak current of the TFT 30 due to light is greatly reduced.

Furthermore, in the fourth embodiment, as shown in FIG. 11, in an area including the area where the channel region 1a' is formed, the light-shielding conductive film 90a, the intermediate conductive layer 80a, and the first light-shielding film 11a are formed such that the pattern width decreases in this order, thereby preventing the first light-shielding film 11a from being directly illuminated with incident light. Furthermore, because the polysilicon film serving as the intermediate conductive layer 80a is present between the light-shielding conductive film 90a and the semiconductor layer 1a, it is possible to advantageously absorb light reflected at the surface of the first light-shielding film 11a and light reflected from the TFT array substrate 10, and thus the light-shielding ability is enhanced.

In the fourth embodiment, because the non-aperture area can be formed on the TFT array substrate 10 using the data line 6a, the conductive film 90a having the ability to block light, and the first light-shielding film 11a, it is not necessary to dispose a light-shielding film on the opposite substrate 20. Therefore, even if an alignment error occurs when the TFT array substrate 10 and the opposite substrate 20 are mechanically bonded to each other, no change occurs in the area (aperture area) through which light is passed, because no light-shielding film is disposed on the opposite substrate 20. As a result, good repeatability is obtained in the pixel aperture ratio and the number of defective electro-optical devices is greatly reduced.

(General Structure of the Electro-Optical Device)

Figure 13:
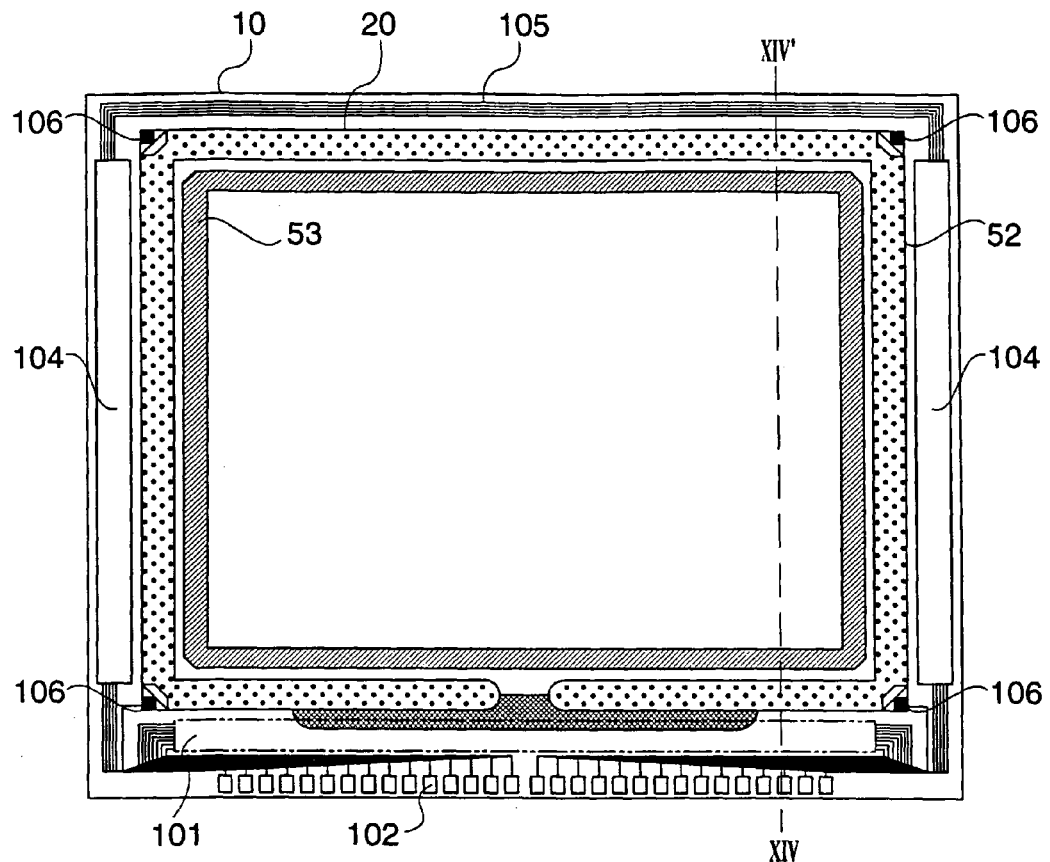
FIG. 13 is a plan view seen from the side of an opposite substrate, wherein various elements formed on the TFT array substrate of the liquid crystal apparatus according to the exemplary embodiments are shown.
Figure 14:
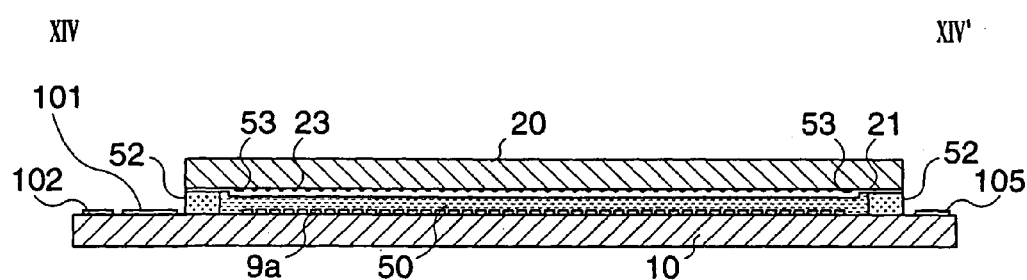
FIG. 14 is a cross-sectional view taken along line XIV-XIV' of FIG. 13.

Referring to FIGS. 13 and 14, the general structure of the electro-optical device according to one of the embodiments is described below. FIG. 13 is a plan view seen from the side of the opposite substrate 20, wherein various elements formed on the TFT array substrate 10 are shown. FIG. 14 is a cross-sectional view taken along line XIV-XIV' of FIG. 13.

As shown in FIG. 13, a sealing material 52 is disposed on the TFT array substrate 10 along the periphery thereof. A third light-shielding film 53, serving as a peripheral partition which defines the edge of the image display area, is formed of the same material as that of the second light-shielding film 23 or a different material is disposed in an inner area along the sealing material 52. In an area outside the sealing material 52, a data line driving circuit 101 for driving the data lines 6a so as to supply an image signal with predetermined timings and external connection terminals 102 are disposed along one side of the TFT array substrate 10. Along the two sides immediately adjacent to the above side, a scanning line driving circuit 104 for supplying a scanning signal over the scanning lines 3a in accordance with predetermined timing is disposed. In the case where a delay in the propagation of the scanning signal supplied to the scanning line 3a is allowed, the scanning line driving circuit 104 may be disposed only on one side. The data line driving circuit 101 may be divided into two parts, and they may be disposed at two sides of the image displaying area. A plurality of interconnections 105 extend along the remaining side on the TFT array substrate 10 so that the two scanning line driving circuits disposed at two sides of the image display area are connected to each other via the interconnections 105. A vertical conducting member 106 is disposed at least at one corner of the opposite substrate 20 so that the TFT array substrate 10 and the opposite substrate 20 are electrically connected to each other via the conducting member 106. As shown in FIG. 14, the opposite substrate 20 having an outer shape and size similar to those of the sealing material 52 shown in FIG. 13 is adhesively bonded to the TFT array substrate 10 via the sealing material 52. In addition to the data line driving circuit 101 and the scanning line driving circuit 104, a sampling circuit for applying an image signal to a plurality of data lines 6a in accordance with predetermined timing and a precharging circuit for supplying a precharging signal with a predetermined voltage level to the plurality of data lines 6a before supplying the image signal may also be disposed on the TFT array substrate 10. Furthermore, there may be provided a test circuit for testing the quality or detecting a defect in the liquid crystal device during the production process or before shipment.

Although in the respective embodiments described above with reference to FIGS. 1 to 14, the data line driving circuit 101 and the scanning line driving circuit 104 are disposed on the TFT array substrate 10, the data line driving circuit 101 and the scanning line driving circuit 104 may be formed in a driving LSI mounted on a TAB (tape automated bonding substrate) and electrically and mechanically connected to the TFT array substrate 10 via an anisotropic conducting film. A polarizing film, an optical retardation film, and/or a polarizer are properly disposed on the side of the opposite substrate 20 which is exposed to the projection light ray and also on the side of the TFT array substrate 10 from which the projection light ray emerges, depending on the operation mode such as a TN (twisted nematic) mode, a VA (vertically aligned) mode, a PDLC (polymer dispersed liquid crystal) mode, or normally white mode/normally black mode.

When the electro-optical device according to one of the embodiments described above is used in a color liquid crystal projector, three similar electro-optical devices are used as R (red), G (green), and B (blue) light valves, respectively, wherein light rays with different colors created by passing a light ray through RGB color separation dichroic mirrors are passed through the respective liquid crystal apparatus. Therefore, in the embodiments, no color filter is disposed on the opposite substrate 20. However, an RGB color filter with a protective film may also be formed on the opposite substrate 20, in proper areas corresponding to the pixel electrodes 9a where the second light-shielding film 23 is not formed. Alternatively, a color filter layer may be formed using a color resist or the like on the TFT array substrate 10 at a location below each pixel electrode 9a. This allows the electro-optical device according to one of the embodiments to be employed in an electro-optical device of a type other than the liquid crystal projector, such as a direct-view-type or reflective-type color electro-optical device. Furthermore, micro lenses may be formed on the opposite substrate 20, at locations corresponding to the respective pixels so that the incident light is focused in a more efficient fashion thereby achieving a brighter electro-optical device. Still furthermore, an interference film consisting a large number of layers with different refractive index may be deposited on the opposite substrate 20, thereby forming a dichroic filter for producing an RGB color utilizing interference of light. By adding the dichroic filter to the opposite substrate, a still brighter color electro-optical device can be achieved.

Although in the above-described embodiments, light is incident on the electro-optical device from the side of the opposite substrate 20 as in the conventional electro-optical device, light may be incident on the device from the side of the TFT array substrate 10 and may emerge from the side of the opposite substrate 20 without causing a problem because there is provided the first light-shielding film 11a. That is, when the electro-optical device is mounted on a liquid crystal projector, the channel region 1a' of the semiconductor layer 1a and neighboring areas are protected from illumination of light, and thus it is possible to display a high-quality image. It is not necessary to dispose an additional polarizer coated with an AR (anti-reflection) film or it is not necessary to bond an AR film to the TFT array substrate 10, to prevent light from being reflected at the back surface of the TFT array substrate 10. Therefore, it is possible to reduce the material cost. Furthermore, because the polarizer is not required, no reduction in the production yield due to dust or defects occurs during the process of bonding the polarizer. Still furthermore, the excellent light-shielding property makes it possible to employ a bright light source or a polarizing beam splitter for achieving an improved light usage efficiency without causing degradation in the image quality such as light crosstalk.

In the embodiments, the switching devices are each formed into the structure of a normal stagger type or coplanar type polysilicon TFT. Alternatively, an inverted stagger type TFT, an amorphous silicon TFT, or other types of TFTs may also be employed in the respective embodiments.

The electro-optical device according to the present invention is not limited to those described above with reference to particular embodiments, but various modifications and changes are possible without departing from the scope and the spirit of the present invention as defined by the claims and as can be read through the specification. It should be understood that any liquid crystal device with such a modification also falls within the scope of the present invention.

What is claimed is:

1. An electro-optical device, comprising:
   a substrate;
   a plurality of pixel electrodes disposed above a plane of the substrate;

a light-shielding conductive layer disposed above the plane of the substrate, the light-shielding conductive layer having a first portion extending along a first direction, a second portion extending along a second direction that intersects the first direction, and a third portion connected to the first portion and the second portion, the first portion disposed between a first pixel electrode of the plurality of pixel electrodes and a second pixel electrode of the plurality of pixel electrodes adjacent along the second direction to the first pixel electrode when viewed from a direction perpendicular to the plane of the substrate, the second portion disposed between the first pixel electrode and a third pixel electrode of the plurality of pixel electrodes adjacent along the first direction when viewed from the direction perpendicular to the plane of the substrate;

a first data line extending along the first direction, the first data line overlapping at least a part of the first portion of the light-shielding conductive layer;

a second data line extending along the first direction;

a switching element including a gate electrode, a semiconductor layer, and an insulation layer between the gate electrode and the semiconductor layer, the semiconductor layer including a source region electrically connected to the first data line, a channel region overlapping the gate electrode, and a drain region electrically connected to the first pixel electrode; and a capacitor electrode that forms a storage capacitor together with the source region or the drain region, the capacitor electrode having a fourth portion extending along the first direction and a fifth portion extending along the second direction, the fourth portion overlapping at least a part of the first portion of the light-shielding conductive layer and at least a part of the first data line, the fifth portion overlapping at least a part of the second portion of the light-shielding conductive layer, the fifth portion being disposed between the first data line and the second data line when viewed from the direction perpendicular to the plane of the substrate, each of the source region, the channel region, and the drain region overlapping at least a part of the first data line, and the source region or the drain region having a sixth portion extending along the first direction and a seventh portion extending along the second direction, the sixth portion overlapping at least a part of the first portion of the light-shielding conductive layer and at least a part of the first data line, the seventh portion overlapping at least a part of the second portion of the light-shielding conductive layer, the seventh portion being disposed between the first data line and the second data line when viewed from the direction perpendicular to the plane of the substrate.

2. The electro-optical device according to claim 1, the storage capacitor being disposed so as to overlap the first data line.

3. The electro-optical device according to claim 2, the light-shielding conductive layer being wider than the capacitor electrode.

4. A projector, comprising:
a light valve including the electro-optical device of claim 1.

5. The electro-optical device according to claim 1,
wherein the first data line is disposed within the light-shielding conductive layer in plan view,
wherein the first and second capacitor electrodes are narrower than the light-shielding conductive layer.

6. The electro-optical device according to claim 1, the light-shielding conductive layer having an island shape.

7. The electro-optical device according to claim 1, wherein the forth portion and the fifth portion of the capacitor electrode does not overlap the third portion of the light-shielding conductive layer.

8. An electro-optical device, comprising:
a substrate;
a plurality of pixel electrodes disposed above a plane of the substrate;
a light-shielding conductive layer disposed above the plane of the substrate, the light-shielding conductive layer having a first portion extending along a first direction, a second portion extending along a second direction that intersects the first direction, and a third portion connected to the first portion and the second portion, the first portion disposed between a first pixel electrode of the plurality of pixel electrodes and a second pixel electrode of the plurality of pixel electrodes adjacent along the second direction to the first pixel electrode when viewed from a direction perpendicular to the plane of the substrate, the second portion disposed between the first pixel electrode and a third pixel electrode of the plurality of pixel electrodes adjacent along the first direction when viewed from the direction perpendicular to the plane of the substrate;
a first data line extending along the first direction, the first data line overlapping at least a part of the first portion of the light-shielding conductive layer;
a second data line extending along the first direction;
a switching element including a gate electrode, a semiconductor layer, and an insulation layer between the gate electrode and the semiconductor layer, the semiconductor layer including a source region electrically connected to the first data line, a channel region overlapping the gate electrode, and a drain region electrically connected to the first pixel electrode; and
a capacitor electrode that forms a storage capacitor together with the source region or the drain region, the capacitor electrode having a fourth portion extending along the first direction and a fifth portion extending along the second direction, the fourth portion overlapping at least a part of the first portion of the light-shielding conductive layer and at least a part of the first data line, the fifth portion overlapping at least a part of the second portion of the light-shielding conductive layer, the fifth portion being disposed between the first data line and the second data line when viewed from the direction perpendicular to the plane of the substrate,
the semiconductor layer overlapping at least a part of the first data line, and
the source region or the drain region having a sixth portion extending along the first direction and a seventh portion extending along the second direction, the sixth portion overlapping at least a part of the first portion of the light-shielding conductive layer and at least a part of the first data line, the seventh portion overlapping at least a part of the second portion of the light-shielding conductive layer, the seventh portion being disposed between the first data line and the second data line when viewed from the direction perpendicular to the plane of the substrate.

9. The electro-optical device according to claim 8, the storage capacitor being disposed so as to overlap the first data line.

10. The electro-optical device according to claim 9, the light-shielding conductive layer being wider than the capacitor electrode.

11. A projector, comprising:
a light valve including the electro-optical device of claim 8.

12. The electro-optical device according to claim 8, the light-shielding conductive layer having an island shape.

13. An electro-optical device, comprising:
a substrate;
a plurality of pixel electrodes disposed above a plane of the substrate;
a first data line extending along a first direction;
a second data line extending along the first direction;
a light-shielding conductive layer disposed above the plane of the substrate, the light-shielding conductive layer having a first portion extending along the first direction, a second portion extending in a second direction that intersects the first direction, and a third portion connected to the first portion and the second portion, the first portion disposed between a first pixel electrode of the plurality of pixel electrodes and a second pixel electrode of the plurality of pixel electrodes adjacent along the second direction to the first pixel electrode when viewed from a direction perpendicular to the plane of the substrate, the second portion disposed between the first pixel electrode and a third pixel electrode of the plurality of pixel electrodes adjacent along the first direction when viewed from the direction perpendicular to the plane of the substrate;
a switching element including a semiconductor layer, the semiconductor layer overlapping the light-shielding conductive layer and including a channel region, a source region electrically connected to the first data line, and a drain region electrically connected to the first pixel electrode with the light-shielding conductive layer; and
a capacitor electrode that forms a storage capacitor together with the source region or the drain region, the capacitor electrode having a fourth portion extending along the first direction and a fifth portion extending along the second direction, the fourth portion overlapping at least a part of the first portion of the light-shielding conductive layer and at least a part of the first data line, the fifth portion overlapping at least a part of the second portion of the light-shielding conductive layer, the fifth portion being disposed between the first data line and the second data line when viewed from the direction perpendicular to the plane of the substrate,
each of the source region, the channel region, and the drain region overlapping at least a part of the first data line, and
the source region or the drain region having a sixth portion extending along the first direction and a seventh portion extending along the second direction, the sixth portion overlapping at least a part of the first portion of the light-shielding conductive layer and at least a part of the first data line, the seventh portion overlapping at least a part of the second portion of the light-shielding conductive layer, the seventh portion being disposed between the first data line and the second data line when viewed from the direction perpendicular to the plane of the substrate.

14. The electro-optical device according to claim 13, a width of the first portion being larger than a width of the first data line.

15. The electro-optical device according to claim 13, a width of the fourth portion being narrower than a width of the first portion.

16. A projector, comprising:
a light valve including the electro-optical device of claim 13.

17. The electro-optical device according to claim 13, the light-shielding conductive layer having an island shape.

18. An electro-optical device, comprising:
a substrate;
a plurality of pixel electrodes disposed above a plane of the substrate;
a first data line extending along a first direction;
a second data line extending along the first direction;
a light-shielding conductive layer disposed above the plane of the substrate, the light-shielding conductive layer having a first portion extending along the first direction, a second portion extending in a second direction that intersects the first direction, and a third portion connected to the first portion and the second portion, the first portion overlapping at least a part of the first data line when viewed from a direction perpendicular to the plane of the substrate, the second portion being disposed between the first data line and the second data line when viewed from the direction perpendicular to the plane of the substrate;
a switching element including a semiconductor layer, the semiconductor layer overlapping the light-shielding conductive layer and including a channel region, a source region electrically connected to the first data line, and a drain region electrically connected to a pixel electrode with the light-shielding conductive layer; and
a capacitor electrode that forms a storage capacitor together with the source region or the drain region, the capacitor electrode having a fourth portion extending along the first direction and a fifth portion extending along the second direction, the fourth portion overlapping at least a part of the first portion of the light-shielding conductive layer and at least a part of the first data line, the fifth portion overlapping at least a part of the second portion of the light-shielding conductive layer, the fifth portion being disposed between the first data line and the second data line when viewed from the direction perpendicular to the plane of the substrate,
each of the source region, the channel region, and the drain region overlapping at least a part of the first data line, and
the source region or the drain region having a sixth portion extending along the first direction and a seventh portion extending along the second direction, the sixth portion overlapping at least a part of the first portion of the light-shielding conductive layer and at least a part of the first data line, the seventh portion overlapping at least a part of the second portion of the light-shielding conductive layer, the seventh portion being disposed between the first data line and the second data line when viewed from the direction perpendicular to the plane of the substrate.

19. The electro-optical device according to claim 18, the storage capacitor being disposed so as to overlap the first data line.

20. The electro-optical device according to claim 18, the light-shielding conductive layer having an island shape.

* * * * *